US012679939B2

(12) United States Patent
Irifune et al.

(10) Patent No.: US 12,679,939 B2
(45) Date of Patent: Jul. 14, 2026

(54) HEAT-SHRINKABLE POLYESTER FILM

(71) Applicant: C.I. TAKIRON Corporation, Osaka (JP)

(72) Inventors: Tatsuya Irifune, Osaka (JP); Takuma Kaneko, Osaka (JP); Yuichiro Kanzaka, Osaka (JP); Shuuta Yuge, Osaka (JP)

(73) Assignee: C.I. TAKIRON CORPORATION, Osaka (JP)

( * ) Notice: Subject to any disclaimer, the term of this patent is extended or adjusted under 35 U.S.C. 154(b) by 260 days.

(21) Appl. No.: 18/571,342

(22) PCT Filed: Jun. 22, 2022

(86) PCT No.: PCT/JP2022/024981

§ 371 (c)(1),
(2) Date: Dec. 18, 2023

(87) PCT Pub. No.: WO2023/032429

PCT Pub. Date: Mar. 9, 2023

(65) Prior Publication Data

US 2024/0352202 A1      Oct. 24, 2024

(30) Foreign Application Priority Data

Aug. 31, 2021    (JP) ................................. 2021-141812

(51) Int. Cl.
C08J 5/18          (2006.01)
B29C 61/02       (2006.01)
(Continued)

(52) U.S. Cl.
CPC ................ C08J 5/18 (2013.01); B29C 61/02 (2013.01); C08G 63/183 (2013.01);
(Continued)

(58) Field of Classification Search
None
See application file for complete search history.

(56) References Cited

U.S. PATENT DOCUMENTS

| | | | | |
|---|---|---|---|---|
| 5,859,116 A | * | 1/1999 | Shih ..................... | C08L 67/025 |
| | | | | 524/493 |
| 2003/0088033 A1 | * | 5/2003 | Shelby ................. | B29C 61/003 |
| | | | | 525/444 |

(Continued)

FOREIGN PATENT DOCUMENTS

| | | |
|---|---|---|
| JP | S61064430 A | 4/1986 |
| JP | S61203161 A | 9/1986 |

(Continued)

*Primary Examiner* — Vivian Chen
(74) *Attorney, Agent, or Firm* — Renner, Kenner; Arthur M. Reginelli

(57)          ABSTRACT

The blocking phenomenon at the time of recycling can be effectively suppressed. Provided is a heat-shrinkable polyester film derived from a first polyester resin and a second polyester resin as a plurality of polyester resins having different crystallinity, the heat-shrinkable polyester film satisfying the following characteristics (A) to (E).

(A) and (B): The first polyester resin includes terephthalic acid, in which a reaction amount of ethylene glycol is in the range of 50 mol % or more and below 90 mol %, and the second polyester resin includes terephthalic acid, in which a reaction amount of ethylene glycol is 90 mol % or more.

(C) and (D): When predetermined isothermal crystallization measurement is performed, an exothermic peak appears within 12 minutes from the start, including a cooling process time, and the heat quantity of the exothermic peak is 5 to 35 J/g.

(E): The thermal shrinkage ratio in the main shrinkage direction as measured under predetermined conditions is 20% to 60%.

9 Claims, 13 Drawing Sheets

(51) Int. Cl.

| | |
|---|---|
| *B29K 67/00* | (2006.01) |
| *B29K 105/00* | (2006.01) |
| *B29L 7/00* | (2006.01) |
| *B32B 27/36* | (2006.01) |
| *C08G 63/123* | (2006.01) |
| *C08G 63/127* | (2006.01) |
| *C08G 63/137* | (2006.01) |
| *C08G 63/16* | (2006.01) |
| *C08G 63/18* | (2006.01) |
| *C08G 63/181* | (2006.01) |
| *C08G 63/183* | (2006.01) |
| *C08G 63/199* | (2006.01) |
| *C08G 63/66* | (2006.01) |
| *C08G 63/672* | (2006.01) |
| *C08L 67/02* | (2006.01) |

(52) U.S. Cl.

CPC ......... *C08G 63/199* (2013.01); *C08G 63/672* (2013.01); *C08L 67/02* (2013.01); *B29K 2067/00* (2013.01); *B29K 2105/256* (2013.01); *B29K 2995/0049* (2013.01); *B29L 2007/00* (2013.01); *B32B 27/36* (2013.01); *C08G 63/123* (2013.01); *C08G 63/127* (2013.01); *C08G 63/137* (2013.01); *C08G 63/16* (2013.01); *C08G 63/18* (2013.01); *C08G 63/181* (2013.01); *C08G 63/66* (2013.01); *C08J 2300/30* (2013.01); *C08J 2367/02* (2013.01); *C08J 2400/30* (2013.01); *C08J 2467/02* (2013.01); *C08L 2205/025* (2013.01); *C08L 2207/20* (2013.01); *Y02P 20/143* (2015.11); *Y02W 30/62* (2015.05)

(56) References Cited

U.S. PATENT DOCUMENTS

| | | | |
|---|---|---|---|
| 2009/0227735 A1* | 9/2009 | Shih ............................ C08J 5/18 | |
| | | | 525/190 |
| 2019/0330441 A1 | 10/2019 | Shin et al. | |
| 2021/0394468 A1* | 12/2021 | Peters ...................... B29D 7/01 | |
| 2021/0395446 A1* | 12/2021 | Peters ...................... B29D 7/01 | |
| 2022/0363822 A1* | 11/2022 | Peters .................. C08G 63/866 | |
| 2023/0002574 A1* | 1/2023 | Yang ........................... C08J 5/18 | |
| 2023/0323021 A1 | 10/2023 | Haruta | |
| 2024/0279389 A1* | 8/2024 | Kim ..................... C08G 63/672 | |
| 2025/0196420 A1* | 6/2025 | Williams ............... B32B 27/08 | |

FOREIGN PATENT DOCUMENTS

| | | |
|---|---|---|
| JP | S62095341 A | 5/1987 |
| JP | H01127317 A | 5/1989 |
| JP | 2007056156 A | 3/2007 |
| JP | 2010248496 A | 11/2010 |
| JP | 2020-521823 A | 7/2020 |
| WO | 2020076749 A | 4/2020 |
| WO | 2022044959 A1 | 3/2022 |

* cited by examiner

~10

~10a
~10
~10b

~10c
~10

MIXING PROPORTION OF FIRST POLYESTER RESIN /
SECOND POLYESTER RESIN (−)

MIXING PROPORTION OF FIRST POLYESTER RESIN /
SECOND POLYESTER RESIN (−)

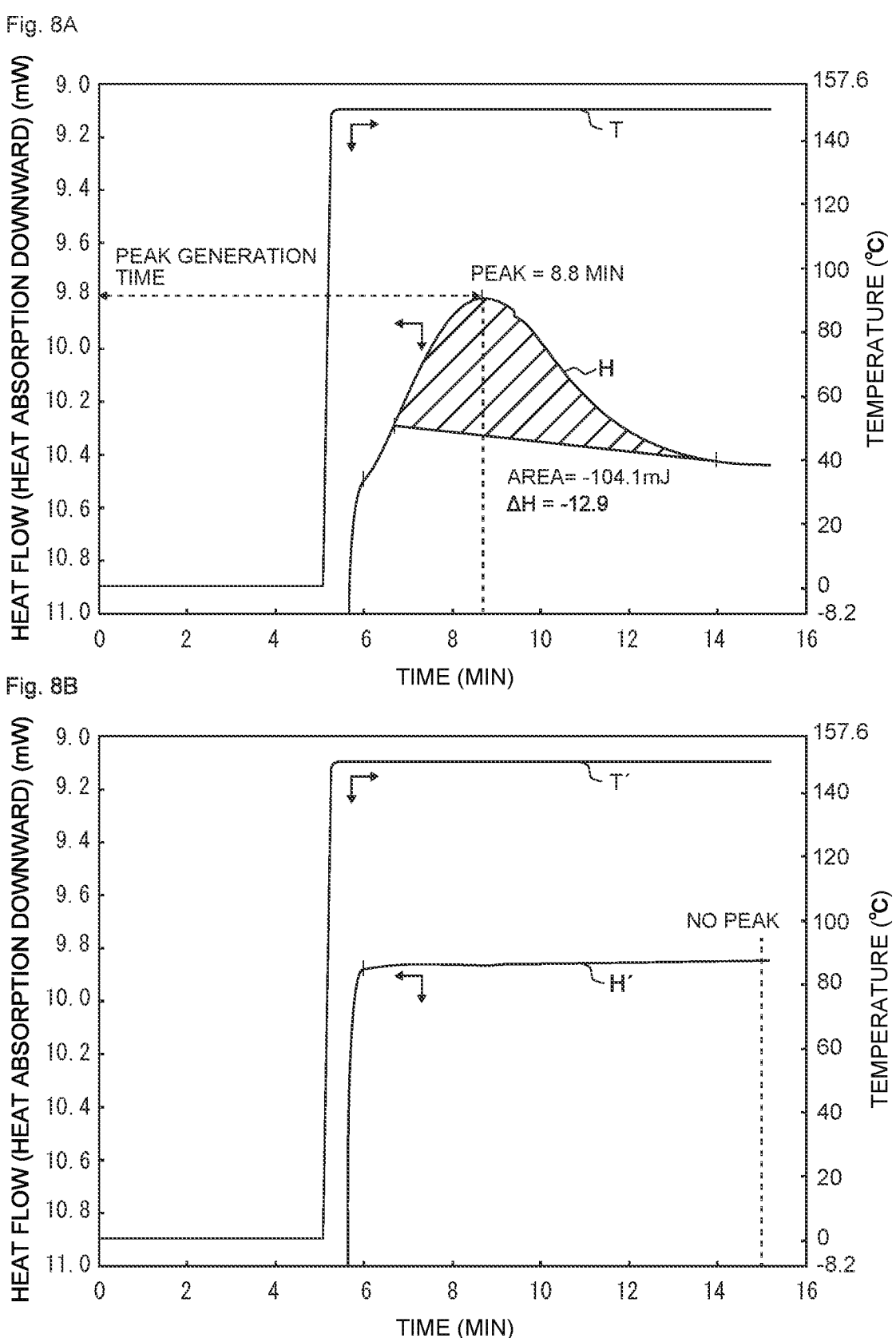

HEAT-SHRINKABLE POLYESTER FILM

TECHNICAL FIELD

The present invention relates to a heat-shrinkable polyester film (may be simply referred to as heat-shrinkable polyester film or heat-shrinkable film).

More particularly, the present invention relates to a heat-shrinkable polyester film that effectively and quantitatively suppresses a blocking phenomenon when recycled, while maintaining excellent fittability on PET bottles.

BACKGROUND ART

Polyethylene resin (HDPE) bottles and polyester resin (PET) bottles (hereinafter, may be simply referred to as PET bottles) have been hitherto heavily used as beverage storage containers, detergent storage containers, and the like.

Particularly, as beverage storage containers, PET bottles have been widely distributed worldwide because they are excellent in terms of lightweight property and durability and are highly convenient.

On the other hand, such PET bottles are dumped into rivers after use, and the dumped bottles cause serious environmental problems such as runoff to the oceans.

Thus, in order to solve such environmental problems, studies have been actively conducted to improve the technologies for collecting and recycling the PET bottles.

Furthermore, PET bottles are covered around with predetermined display labels in order to indicate the names and various pieces of information on the contents and to improve decorative properties and the like.

In this regard, conventionally, a method of sticking a label of paper base material with an adhesive has been frequently adopted; however, in recent years, full-surface wrapping of a PET bottle with a display label using a heat-shrinkable film, has become the mainstream.

However, in the case of full-surface wrapping using such a heat-shrinkable film, there are circumstances that when a PET bottle is recycled, it is difficult to readily separate a display label using a heat-shrinkable film due to an adhesive structure of the heat-shrinkable film and the like.

Therefore, as the material for a heat-shrinkable film, a material that is readily separated from a PET bottle and does not hinder a recycling process for PET bottles is preferred.

More specifically, conventionally, a vinyl chloride resin (PVC), a polystyrene resin (PS), a modified polyester (PETG), and the like have been frequently used.

Here, a main material of beverage storage containers and the like is basically PET, and since the ingredient materials of the containers and the heat-shrinkable films are similar, it can be said that it is highly possible to recycle a PETG film as a heat-shrinkable film by melting the film together with PET bottles.

However, since PETG is basically amorphous, PETG basically has no melting point or only has a melting peak with a small calorific value as thermal characteristics, and there is a problem that PETG is likely to cause blocking, by which recycled pellets adhere to each other, during a recycling process of PET bottles wrapped with a heat-shrinkable film.

That is, when PET bottles in a state of being wrapped with a heat-shrinkable film are thermally melted in the recycling process, as shown in FIG. 13A, there is a problem that as a blocking phenomenon, flakes derived from a recycled resin including the heat-shrinkable film adhere to each other to form lumps due to the heat-shrinkable film, and cause clogging in the middle of pipes.

Therefore, there is a problem that recycled pellets obtainable when PET bottles including the heat-shrinkable films are melted under normal circumstances, do not adhere to each other, and it is practically difficult to produce recycled pellets having a predetermined shape effectively and stably as shown in FIG. 13B by using a pelletizer.

Thus, there have been proposed heat-shrinkable polyester films that are obtained by adjusting the thermal characteristics of PETG films and have a predetermined melting peak (melting point) in differential scanning calorimetry (DSC) (Patent Document 1 and Patent Document 2).

Such heat-shrinkable polyester film disclosed in Patent Document 1 is characterized in that the blending amount of an amorphous polyester resin is reduced in order to improve the recyclability of PET bottles, a crystalline copolymerized polyester resin derived from a diol component and a dicarboxylic acid component is included, and at the time of a heat treatment of immersing the heat-shrinkable polyester film in hot water at 80° C. for 10 seconds, the thermal shrinkage ratio in the main shrinkage direction is 30% or more, while the melting point measured by DSC is 170° C. or higher.

Furthermore, the heat-shrinkable polyester film disclosed in Patent Document 2 is also configured to include: (1) 5% to 95% by weight of a crystallizable polyester, and (2) 5% to 95% by weight of an amorphous polyester composition, so as to improve the recyclability of PET bottles.

More specifically, the heat-shrinkable polyester film is a heat-shrinkable crystalline polyester film in which the (1) crystallizable polyester includes terephthalic acid as a main component, and a polyalcohol reacting with the crystallizable polyester includes a predetermined amount of ethylene glycol and at least one of neopentyl glycol, 1,4-cyclohexanedimethanol, and diethylene glycol.

Furthermore, in the (2) amorphous polyester composition, the dicarboxylic acid component includes about 70 mol % to about 100 mol % of terephthalic acid residue, and the diol component includes about 40 mol % or less of neopentyl glycol residue, about 40 mol % or less of 1,4-cyclohexanedimethanol residue, and ethylene glycol and diethylene glycol residues for the rest.

CITATION LIST

Patent Document

Patent Document 1: JP 2020-521823 A (Claims and the like)

Patent Document 2: WO 2020/076749 (Claims and the like)

DISCLOSURE OF THE INVENTION

Problem to be Solved by the Invention

However, in the case of the heat-shrinkable polyester films disclosed in Patent Document 1 and Patent Document 2, there was no intention of creating a configuration from a heat-shrinkable polyester film derived from a plurality of polyester resins with different crystallinities and controlling the mixing ratios of the polyester resins and the like.

In addition, when isothermal crystallization measurement was performed by DSC for both the heat-shrinkable polyester films, the time at which an exothermic peak appears and the amount of heat corresponding to the area of the exothermic peak were neither intended nor controlled.

Therefore, there is a problem that the quantity of agglomerates generated during recycling varies, and the blocking phenomenon cannot be suppressed effectively and quantitatively.

On the other hand, in order to further suppress the blocking phenomenon in both the heat-shrinkable polyester films of Patent Document 1 and Patent Document 2, when the crystallinity of the heat-shrinkable polyester films is increased to raise the melting point, there is a problem that it is difficult to adjust the thermal shrinkage ratio and thermal shrinkage stress, and fittability is noticeably deteriorated.

Therefore, conventionally, when PET bottles are recycled after inserting breaking lines so that the heat-shrinkable polyester films can be easily removed, a technique of manually removing the wrapped heat-shrinkable polyester film in advance is employed.

Thus, the inventors of the present invention made intensive efforts in view of the above-described problems, and as a result, the inventors found that with regard to a heat-shrinkable polyester film derived from a plurality of polyester resins having different crystallinities (at least a first polyester resin and a second polyester resin), when various characteristics such as the exothermic peak time and the exothermic peak area obtained by isothermal crystallization at a predetermined temperature, and the thermal shrinkage ratio in the main shrinkage direction are simultaneously satisfied, not only satisfactory fittability is obtained, but also the blocking phenomenon can be suppressed effectively and quantitatively during recycling.

That is, it is an object of the present invention to provide a heat-shrinkable polyester film with which, even when a PET bottle in a state of being covered with the heat-shrinkable polyester film is recycled together with the heat-shrinkable polyester film, satisfactory fittability and excellent blocking resistance are each obtained quantitatively in a well-balanced manner, while maintaining excellent fittability on a PET bottle.

Means for Solving Problem

According to the present invention, there is provided a heat-shrinkable polyester film derived from a first polyester resin and a second polyester resin as a plurality of polyester resins having different crystallinity, which are reaction products of a polyvalent carboxylic acid and a polyalcohol, the heat-shrinkable polyester film satisfying the following characteristics (A) to (E), and the above-mentioned problems can be solved.

(A) The first polyester resin is an amorphous polyester resin in which the polyvalent carboxylic acid includes at least terephthalic acid, and when a total amount of the polyalcohol is taken as 100 mol %, a reaction amount of ethylene glycol is within the range of 50 mol % or more and below 90 mol %.

(B) The second polyester resin is a crystalline polyester resin (hereinafter, may be referred to as low-crystalline polyester resin), in which the polyvalent carboxylic acid includes at least terephthalic acid, and when the total amount of the polyalcohol is taken as 100 mol %, a reaction amount of ethylene glycol is 90 mol % or more.

(C) The heat-shrinkable polyester film is a heat-shrinkable polyester film in which when isothermal crystallization measurement at 150° C., including a cooling process at a constant temperature, is performed by DSC, an exothermic peak appears within 12 minutes from the start, including the cooling process time.

(D) The heat-shrinkable polyester film is a heat-shrinkable polyester film in which when isothermal crystallization measurement at 150° C., including a cooling process at a constant temperature, is performed by DSC, a heat quantity corresponding to an exothermic peak area is within the range of 5 to 35 J/g.

(E) The heat-shrinkable polyester film is a heat-shrinkable polyester film in which a thermal shrinkage ratio in a main shrinkage direction as measured under thermal shrinkage conditions of being immersed in hot water at 80° C. for 10 seconds, is within the range of 20% to 60%.

Thus, with regard to a heat-shrinkable polyester film derived from a predetermined first polyester resin (configuration A) and a predetermined second polyester resin (configuration B) having different crystallinities, when various characteristics such as the exothermic peak time (configuration C) and the exothermic peak area (configuration D) obtained by isothermal crystallization, and the thermal shrinkage ratio (configuration E) in the main shrinkage direction are simultaneously satisfied, the blocking phenomenon can be suppressed effectively and quantitatively when the heat-shrinkable polyester film is subjected to recycling, while maintaining excellent fittability.

More specifically, a heat-shrinkable polyester film satisfying the configurations (A) to (E) can be used as a heat-shrinkable polyester film in which satisfactory fittability and excellent blocking resistance are each obtained quantitatively in a well-balanced manner.

Furthermore, upon configuring the heat-shrinkable polyester film of the present invention, it is preferable that a weight-based mixing ratio of the first polyester resin/second polyester resin has a value within the range of 20/80 to 80/20.

By limiting the mixing ratio of a plurality of polyester resins in a predetermined range in this way, a heat-shrinkable polyester film in which the blocking phenomenon is suppressed more effectively and quantitatively when subjected to recycling, while maintaining excellent fittability on PET bottles, can be obtained.

Furthermore, upon configuring the heat-shrinkable polyester film of the present invention, it is preferable that the first polyester resin is an amorphous polyester resin including at least 1,4-cyclohexanedimethanol, and the reaction amount of this 1,4-cyclohexanedimethanol is within the range of 1 mol % or more and below 35 mol % when the total amount (reaction amount) of the polyalcohol is taken as 100 mol %.

By limiting the type and content of the polyalcohol, which is one of the polymerization components of the first polyester resin, to predetermined ranges in this way, the crystallinity can be adjusted more effectively and quantitatively.

Therefore, through a predetermined relationship between the first polyester resin and the second polyester resin, the balance between satisfactory fittability and excellent blocking resistance is improved, and those properties can be quantitatively adjusted.

Furthermore, upon configuring the heat-shrinkable polyester film of the present invention, it is preferable that the second polyester resin is a crystalline polyester resin including ethylene glycol alone or both ethylene glycol and diethylene glycol, in which when the second polyester resin includes both ethylene glycol and diethylene glycol, the reaction amount of ethylene glycol is 90 mol % or more, while the reaction amount of diethylene glycol is within the range of 1 mol % to 10 mol %, when the total amount of the polyalcohol is taken as 100 mol %.

By limiting the type and the reaction amount of the polyalcohol, which is one of the polymerization components of the second polyester resin, to predetermined ranges in this way, the content percentage of a crystalline portion can be adjusted effectively and quantitatively.

Therefore, through a predetermined relationship between the first polyester resin and the second polyester resin, satisfactory fittability and excellent blocking resistance can be each obtained quantitatively in a well-balanced manner.

Furthermore, upon configuring the heat-shrinkable polyester film of the present invention, it is preferable that the second polyester resin is a homopolyester resin and a post-consumer recycled polyester resin (may be referred to as PCRP), or either one of them.

By limiting the type of the second polyester resin in this way, waste is reduced, this contributes to reutilization of environmental resources, and at the same time, the price is lowered, which is economically advantageous.

Therefore, through a predetermined relationship between the first polyester resin and the second polyester resin, the balance between satisfactory fittability and excellent blocking resistance is further improved, and those properties can be obtained quantitatively.

Furthermore, upon configuring the heat-shrinkable polyester film of the present invention, it is preferable that when the total amount of the first polyester resin and the second polyester resin is taken as 100 parts by weight (pbw), the blending amount of a lubricating agent has a value within the range of 0.01 to 5 parts by weight.

By blending a lubricating agent and limiting the blending amount thereof in this way, even when the heat-shrinkable polyester film is formed into a long roll, fusion between heat-shrinkable polyester films that come into contact can be prevented while suppressing impacts on the characteristics of the heat-shrinkable polyester film, and in addition, the lubricating agent may help in further suppressing the blocking phenomenon during recycling.

Furthermore, upon configuring the heat-shrinkable polyester film of the present invention, it is preferable that the heat-shrinkable polyester film further satisfies the following characteristic (F).

(F) The thermal shrinkage ratio in a direction orthogonally intersecting the main shrinkage direction as measured under the thermal shrinkage conditions of being immersed in hot water at 80° C. for 10 seconds, is within the range of −3% to 10%.

As the characteristic (F) is satisfied in this way, not only appropriate thermal shrinkability is obtained and satisfactory fittability on PET bottles and the like is obtained, but also the blocking phenomenon during recycling can be suppressed effectively and quantitatively.

Furthermore, upon configuring the heat-shrinkable polyester film of the present invention, it is preferable that the heat-shrinkable polyester film further satisfies the following characteristic (G).

(G) The thermal shrinkage stress in the main shrinkage direction as measured under the thermal shrinkage conditions of being immersed in hot water at 80° C. for 10 seconds is 8 MPa or less.

As the characteristic (G) is satisfied in this way, not only appropriate thermal shrinkability is obtained and satisfactory fittability is obtained without damaging PET bottles and the like, but also the blocking phenomenon during recycling can be suppressed effectively and quantitatively.

BRIEF DESCRIPTION OF DRAWINGS

FIGS. 8A and 8B are diagrams provided to explain DSC charts of heat-shrinkable polyester films (Example 1 and Comparative Example 1, respectively) obtained by isothermal crystallization including a cooling process at a constant temperature;

EMBODIMENTS FOR CARRYING OUT THE INVENTION

First Embodiment

Figure 1A:
FIGS. 1A to 1C are diagrams for explaining different embodiments of a heat-shrinkable polyester film.
Figure 1B:
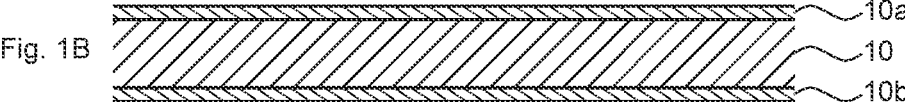
Figure 1C:
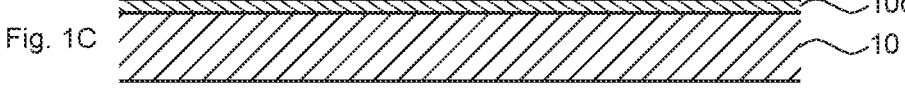

In a first embodiment, as illustrated in FIGS. 1A to 1C, there is provided a heat-shrinkable polyester film derived from a first polyester resin and a second polyester resin as a plurality of polyester resins having different crystallinity, which are reaction products of a polyvalent carboxylic acid and a polyalcohol, the heat-shrinkable polyester film satisfying the following characteristics (A) to (E), and the above-mentioned problems can be solved.

(A) The first polyester resin is an amorphous polyester resin in which the polyvalent carboxylic acid includes at least terephthalic acid, and when the total amount of the polyalcohol is taken as 100 mol %, the reaction amount of ethylene glycol is within the range of 50 mol % or more and below 90 mol %.

(B) The second polyester resin is a crystalline polyester resin (may be referred to as low-crystalline polyester resin) in which the polyvalent carboxylic acid includes at least terephthalic acid, and when the total amount of the polyalcohol is taken as 100 mol %, the reaction amount of ethylene glycol is 90 mol % or more.

(C) A heat-shrinkable polyester film in which when measurement of isothermal crystallization at 150° C., including a cooling process at a constant temperature, is carried out by DSC, an exothermic peak appears within 12 minutes from the start, including the cooling process time.

(D) A heat-shrinkable polyester film in which when isothermal crystallization measurement at 150° C., including a cooling process at a constant temperature, is performed by DSC, the heat quantity corresponding to the exothermic peak area is within the range of 5 to 35 J/g.

(E) A heat-shrinkable polyester film in which the thermal shrinkage ratio in the main shrinkage direction as measured under the thermal shrinkage conditions of being immersed in hot water at 80° C. for 10 seconds is within the range of 20% to 60%.

Hereinafter, the heat-shrinkable polyester film of the first embodiment will be specifically described by dividing the subject matter into each constituent element, with appropriate reference to the drawings.

1. First Polyester Resin (1) Polyvalent Carboxylic Acid

The polyvalent carboxylic acid, which is one of the polymerization components (raw material components) of the first polyester resin, is not particularly limited as long as it is a compound that can react with a polyalcohol and form a polyester structure, and for example, the polyvalent carboxylic acid may be at least one of aliphatic acid dicarboxylic acids such as adipic acid, sebacic acid, and azelaic acid; aromatic dicarboxylic acids such as terephthalic acid, naphthalene dicarboxylic acid, and isophthalic acid; alicyclic dicarboxylic acids such as 1,4-cyclohexanedicarboxylic acid; and ester-forming derivatives of these.

Particularly, when terephthalic acid is used, satisfactory reactivity with a polyalcohol is obtained, a crystalline polyester structure and the like are easily formed, and the material is relatively inexpensive, which is economically advantageous.

Therefore, when the total amount of the polyvalent carboxylic acid used is taken as 100 mol %, it is preferable that the reaction amount of terephthalic acid has a value of 90 mol % or more, and more preferably a value within the range of 95 mol % to 100 mol %.

(2) Type of Polyalcohol

A mixture including at least ethylene glycol should be used as the polyalcohol (may be referred to as diol component), which is one of the polymerization components of the first polyester resin.

By limiting the type of the polyalcohol in this way, which is one of the polymerization components of the first polyester resin, the proportion of an amorphous portion can be adjusted, and in addition, not only satisfactory fittability can be obtained but also the blocking phenomenon can be suppressed more effectively through the relationship with the second polyester resin.

Furthermore, upon using a mixture including a predetermined amount of ethylene glycol, it is preferable to use at least one other polyalcohol selected from diols having an alicyclic structure, such as 1,4-cyclohexanedimethanol; aliphatic diols such as diethylene glycol, propanediol, butanediol, neopentyl glycol, and hexanediol; and aromatic diols, in combination as a polyalcohol other than ethylene glycol.

It is because an amorphous polyester resin in which at least crystallinity or amorphousness is controlled is easily obtained by using such a polyalcohol to appropriately react with the polyvalent carboxylic acid. That is, it is because by using a specific polyalcohol in a straight-chain form without branches or in a straight-chain form with branches, the melting point, thermal shrinkage ratio, thermal shrinkage stress, and the like of the polyester resin obtained by reacting the polyalcohol with the polyvalent carboxylic acid can be adjusted more easily to values within predetermined ranges.

Therefore, the other polyalcohol that is used in combination with ethylene glycol is more preferably 1,4-cyclohexanedimethanol and diethylene glycol, or either one of them.

(3) Reaction Amount of Polyalcohol

Furthermore, upon using a mixture including a predetermined amount of ethylene glycol, at least the reaction amount of ethylene glycol has a value of 50 mol % or more and below 90 mol %.

The reason for this is that when the reaction amount of such ethylene glycol is below 50 mol %, problems such as high melt viscosity, poor fluidity, and difficulties in molding may occur.

On the other hand, it is because when the reaction amount of ethylene glycol is 90 mol % or more, an excessively large crystalline portion is produced, and the characteristics such as fittability of the obtained heat-shrinkable polyester film may be noticeably deteriorated.

Incidentally, the reaction amount of each polyalcohol, including ethylene glycol, can be actually determined from the residual amount of each alcohol component and the like; however, the reaction amount can be simply replaced with the feed amount of each alcohol component.

Furthermore, upon using a mixture including a predetermined amount of ethylene glycol as a raw material component, it is preferable that the reaction amount of 1,4-cyclohexanedimethanol and diethylene glycol or either one of them has a value within the range of 1 mol % to 35 mol %.

The reason for this is that when the reaction amount of such 1,4-cyclohexanedimethanol and the like is below 1 mol %, a smaller amorphous portion is produced, and conversely, an excessively large crystalline portion is produced, and the characteristics such as fittability of the obtained heat-shrinkable polyester film may be noticeably deteriorated.

On the other hand, it is because when the total reaction amount of the 1,4-cyclohexanedimethanol and the like is above 35 mol %, problems such as high melt viscosity, poor fluidity, and difficulties in molding may occur. Furthermore, it is because it may be difficult to suppress crystallinity, the glass transition temperature, and the blocking phenomenon during recycling effectively and quantitatively.

Therefore, it is more preferable that the total reaction amount of the 1,4-cyclohexanedimethanol and the like has a value within the range of 5 mol % or more and below 30 mol %, and even more preferably a value within the range of 10 mol % to 28 mol %.

It is more preferable that the molar ratio of 1,4-cyclo-hexanedimethanol and diethylene glycol with respect to the total reaction amount of 1,4-cyclohexanedimethanol and diethylene glycol has a value within the range of 9:1 to 1:9.

In addition to that, in order to change the thermal char-acteristics and the mechanical characteristics of the heat-shrinkable polyester film, another dicarboxylic acid or hydroxycarboxylic acid may be used alone, or a mixture of two or more kinds thereof may be used, to the extent that is not deviated from the purpose of the present invention.

(4) Amorphousness

The first polyester resin is basically amorphous, and regarding the criteria for amorphousness, for example, the amorphousness can be determined from the fact that in DSC measurement, no predetermined melting peak appears, or a calorific value is hardly detected.

Furthermore, similarly, the amorphousness can also be determined from the fact that in DSC measurement, the change point of the specific heat indicating the glass tran-sition temperature is shown in a predetermined temperature range.

In addition, the amorphousness can also be determined from the fact that the degree of crystallization measured according to JIS K 7112 is low.

That is, the degree of crystallization of a polyester resin can be calculated by measuring the density (d) of a sample having a size of about 3 mm on each of four sides by the density gradient column method of JIS K 7112 using an aqueous solution of calcium nitrate, and making reference to the known density (dc) of polyethylene terephthalate perfect crystal and the density (da) of polyethylene terephthalate perfect amorphous, and the proportion of the amorphous portion can be specifically calculated therefrom.

(5) Glass Transition Temperature

Furthermore, it is preferable that the glass transition temperature of the first polyester resin has a value within the range of 50° C. to 90° C.

The reason for this is that when such glass transition temperature is lower than 50° C., in a drying process carried out when recycling PET bottles wrapped with the heat-shrinkable polyester film, the display labels using the heat-shrinkable polyester film are likely to become sticky, recycled pieces in the form of flakes may adhere to each other, and the blocking phenomenon may easily occur.

On the other hand, it is because when the glass transition temperature is higher than 90° C., the heat quantity required for extrusion processing and stretching processing of a raw sheet of the heat-shrinkable polyester film becomes too high, and the processing itself may become difficult, or it may be difficult to control the thermal shrinkage ratio.

Therefore, it is more preferable that the glass transition temperature of the first polyester resin has a value within the range of 60° C. to 85° C., and even more preferably a value within the range of 65° C. to 80° C.

The glass transition temperature of the first polyester resin can be measured by, for example, the following procedure in DSC measurement (hereinafter, the same applies).

1) As 1st-Run, the temperature of the first polyester resin as a measurement sample is raised from room tempera-ture to about 300° C. at a heating rate of 10° C./min.

2) Next, the temperature is rapidly lowered from 300° C. to room temperature at a rate of about 30° C./min.

3) Next, as 2nd-Run, the temperature is raised from room temperature to about 300° C. at a heating rate of 10° C./min.

Then, the change point of the specific heat shown on the DSC chart obtained in the 2nd-Run can be designated as the glass transition temperature of the first polyester resin.

(6) Melting Point

When the first polyester resin has a melting point, it is preferable that the melting point has a value within the range of 190° C. to 270° C.

The reason for this is that when such melting point is lower than 190° C., in a drying process carried out when recycling PET bottles and the like, the display labels using the heat-shrinkable polyester film are likely to become sticky, recycled pieces in the form of flakes may adhere to each other, and the blocking phenomenon may easily occur.

On the other hand, it is because when the melting point is higher than 270° C., the heat quantity required for extrusion processing and stretching processing of a raw sheet of the heat-shrinkable polyester film becomes too high, processing may become difficult, or it may be difficult to control the thermal shrinkage ratio, and the fittability on PET bottles and the like may be noticeably deteriorated.

Therefore, when the first polyester resin has a melting point, it is more preferable that the melting point has a value within the range of 200° C. to 270° C., and even more preferably a value within the range of 210° C. to 270° C.

Incidentally, when the first polyester resin has a melting point, for example, the melting point can be specified as a peak temperature (Tm) of the heat of fusion shown as an endothermic reaction in a profile obtained by using DSC.

(7) Intrinsic Viscosity

It is also preferable that the intrinsic viscosity (IV value) of the first polyester resin has a value within the range of 0.6 to 0.85 dL/g.

The reason for this is that when such intrinsic viscosity has a value of below 0.6 dL/g, the melt viscosity is too low so that there may be a problem with extrusion moldability, or satisfactory blocking resistance may not be obtained in recycling.

On the other hand, it is because when the intrinsic viscosity has a value of above 0.85 dL/g, the melt viscosity is too high, and conversely, there may be a problem with extrusion moldability, or satisfactory fittability may not be obtained.

Therefore, it is more preferable that the intrinsic viscosity has a value within the range of 0.65 to 0.83 dL/g, and even more preferably a value within the range of 0.7 to 0.8 dL/g.

The intrinsic viscosity of a polyester resin can be mea-sured according to JIS K 7390 (hereinafter, the same applies).

That is, more specifically, the intrinsic viscosity (IV value) was measured in a mixed solvent of phenol and 1,1,2,2-tetrachloroethane (weight ratio=1/1) at a tempera-ture of 30° C. by using an Ubbelohde viscometer.

(8) Additives

Furthermore, it is also preferable that the first polyester resin is blended as necessary with various additives such as an oxidation inhibitor, a weather-resistant stabilizer, an antistatic agent, an antifogging agent, a metallic soap, a wax, an antifungal agent, an antibacterial agent, a nucleating agent, a flame retardant, and a lubricating agent (slip agent) in a predetermined amount (for example, at a proportion of 0.01 to 10 parts by weight of the total amount).

Moreover, the method of adding the additives is not particularly limited, and a known method can be used.

Furthermore, it is preferable that the first polyester resin contains an inorganic lubricating agent such as calcium carbonate particles, silica particles, or glass particles, in order to improve the slipperiness at the film surface.

In addition, with regard to the lubricating agent as one of the additives, the type is not particularly limited, and inorganic lubricating agents and organic lubricating agents that are conventionally used for films can be used singly or as mixtures.

More specifically, examples of the inorganic lubricating agents include calcium carbonate particles, silica particles, glass particles, and microparticles formed from zeolite, talc, and kaolin.

Furthermore, examples of the organic lubricating agents include microparticles formed from crosslinked polymethyl methacrylate, crosslinked polystyrene, silicone rubber, a silicone copolymer, polyamide, and a condensed resin having a triazine ring, and above all, microparticles formed from silicone rubber and a silicone copolymer are preferred.

2. Second Polyester Resin (1) Polyvalent Carboxylic Acid

The polyvalent carboxylic acid, which is one of the polymerization components (raw material components) of the second polyester resin, is not particularly limited as long as it is a compound capable of reacting with a polyalcohol and forming a polyester structure; however, the polyvalent carboxylic acid includes at least terephthalic acid.

When terephthalic acid is used in this way, satisfactory reactivity with a polyalcohol is obtained, a crystalline polyester structure is likely to be formed, and the material is relatively inexpensive, which is economically advantageous.

Therefore, when the total amount of the polyvalent carboxylic acid used is taken as 100 mol %, it is preferable that the reaction amount of terephthalic acid has a value of 90 mol % or more, and more preferably a value within the range of 95 mol % to 100 mol %.

In order to change the thermal characteristics and mechanical characteristics of the heat-shrinkable polyester film, it is also preferable that the second polyester resin includes a predetermined amount of at least one of aliphatic acid dicarboxylic acids such as adipic acid, sebacic acid, and azelaic acid; aromatic dicarboxylic acids such as naphthalene dicarboxylic acid and isophthalic acid; alicyclic dicarboxylic acids such as 1,4-cyclohexanedicarboxylic acid; and ester-forming derivatives of these as the polyvalent carboxylic acid other than terephthalic acid, to the extent that is not deviated from the purpose of the present invention.

Particularly, when the polyvalent carboxylic acid other than terephthalic acid is isophthalic acid, isophthalic acid is easily mixed uniformly with terephthalic acid, increases the transparency and thermal shrinkage ratio of the heat-shrinkable polyester film, and can suppress the blocking phenomenon during recycling more effectively and quantitatively.

(2) Type of Polyalcohol

At least ethylene glycol should be used as the polyalcohol (may be referred to as diol component), which is one of the polymerization components of the second polyester resin.

By limiting the type of the polyalcohol in this way, the crystallinity can be adjusted to a desired range, and through the relationship with the first polyester resin, the blocking phenomenon can be suppressed more effectively and quantitatively.

Furthermore, it is also preferable to blend at least one of aliphatic diols such as diethylene glycol, propanediol, butanediol, neopentyl glycol, and hexanediol; alicyclic diols other than 1,4-cyclohexanedimethanol; aromatic diols; and the like, as a polyalcohol other than ethylene glycol.

It is because a low-crystalline polyester resin in which at least crystallinity or amorphousness is controlled is easily obtained by using such a polyalcohol to appropriately react with the polyvalent carboxylic acid.

Particularly, it is more preferable to select diethylene glycol or neopentyl glycol as the other polyalcohol and adopt a combination of ethylene glycol and diethylene glycol or a combination of ethylene glycol and neopentyl glycol.

That is, it is because by using a specific polyalcohol in a straight-chain form without branches or in a straight-chain form with branches, the melting point, thermal shrinkage ratio, thermal shrinkage stress, and the like of the polyester resin obtained by reacting the polyalcohol with the polyvalent carboxylic acid can be adjusted more easily to values within predetermined ranges.

(3) Reaction Amount of Polyalcohol

When the total amount of the polyalcohol used as one of the polymerization components of the second polyester resin is taken as 100 mol %, it is preferable that the reaction amount of ethylene glycol has a value of 90 mol % or more.

The reason for this is that when the reaction amount of such ethylene glycol and the like is below 90 mol %, a smaller crystalline portion is produced, and when mixed with the first polyester resin, it may be difficult to exhibit satisfactory crystallinity. That is, it may be difficult to suppress the blocking phenomenon during recycling effectively and quantitatively.

Therefore, it is more preferable that the reaction amount of the ethylene glycol and the like has a value of 95 mol % or more, and even more preferably a value within the range of 99 mol % to 100 mol %.

In order to change the thermal characteristics and mechanical characteristics of the heat-shrinkable polyester film to the extent that is not deviated from the purpose of the present invention, the above-mentioned diethylene glycol and the like, diols having an alicyclic structure, hydroxycarboxylic acids, and the like may be used singly, or two or more kinds thereof may be used as mixtures.

(4) Type of Other Polyester Resin

As shown in the above-mentioned (1) to (3), the second polyester resin may be a polyester resin obtained by subjecting a predetermined polyvalent carboxylic acid and a predetermined polyol to a condensation reaction at predetermined proportions; however, specifically, it is also preferable to use a homopolyester resin, that is, a polyester resin composed only of terephthalic acid and ethylene glycol.

Furthermore, it is also preferable to use a post-consumer recycled polyester resin, that is, a polyester resin obtained by collecting used PET bottles and the like and subjecting the PET bottles and the like to washing, crushing, drying, and pelletization, as the second polyester resin.

In addition, it is also preferable to use unused polyester resin and at least one of a homopolyester resin, and a post-consumer recycled polyester resin in combination.

A second polyester resin such as this reduces waste, contributes to reutilization of environmental resources, and are also inexpensive, which is economically advantageous.

Therefore, through a predetermined relationship between the first polyester resin and the second polyester resin, the balance between satisfactory fittability and excellent blocking resistance is improved, and those properties can be obtained quantitatively.

(5) Crystallinity and Melting Point

Furthermore, regarding the criteria for crystallinity in the second polyester resin, similarly to the first polyester resin, the crystallinity can be determined from the position of the melting peak (melting point) of the crystalline portion, the heat quantity of the melting peak, and the like obtained by DSC.

Furthermore, similarly, the degree of crystallinity, which is measured according to JIS K 7112, can be measured, and the crystallinity can be determined therefrom.

Furthermore, the melting point of the second polyester resin should have a value within the range of 190° C. to 270° C.

The reason for this is that when such melting point has a value of lower than 190° C., in a drying process carried out when recycling PET bottles wrapped around with the heat-shrinkable polyester film, the display labels using the heat-shrinkable polyester film are likely to become sticky, recycled pieces in the form of flakes may adhere to each other, and the blocking phenomenon may easily occur.

On the other hand, it is because when the melting point has a value of higher than 270° C., the heat quantity required for extrusion processing and stretching processing of a raw sheet of the heat-shrinkable polyester film becomes too high, and the processing may become difficult, or the fittability during use may be noticeably deteriorated.

Therefore, it is more preferable that the melting point of the polyester resin has a value within the range of 200° C. to 270° C., and even more preferably a value within the range of 220° C. to 270° C.

The melting point of the polyester resin can be measured as, for example, a peak temperature (Tm) of the heat of fusion shown as an endothermic reaction in a profile obtained by using DSC (hereinafter, the same applies).

Incidentally, the crystallinity of the polyester resin can be estimated from the area, the half-value width, and the like of the peak of the heat of fusion.

(6) Glass Transition Temperature

When the second polyester resin has a glass transition temperature, it is preferable that the temperature has a value within the range of 50° C. to 90° C.

The reason for this is that when such glass transition temperature is lower than 50° C., in a drying process carried out when recycling PET bottles wrapped around with the heat-shrinkable polyester film, the display labels using the heat-shrinkable polyester film are likely to become sticky, recycled pieces in the form of flakes may adhere to each other, and the blocking phenomenon may easily occur.

On the other hand, it is because when the glass transition temperature is higher than 90° C., the heat quantity required for extrusion processing and stretching processing of a raw sheet of the heat-shrinkable polyester film becomes too high, and processing may become difficult, or it may be difficult to control the thermal shrinkage ratio.

Therefore, when the second polyester resin has a glass transition temperature, it is more preferable that the temperature has a value within the range of 60° C. to 85° C., and even more preferably a value within the range of 65° C. to 80° C.

(7) Intrinsic Viscosity

It is also preferable that the intrinsic viscosity (IV value) of the second polyester resin has a value within the range of 0.6 to 0.85 dL/g.

The reason for this is that when such intrinsic viscosity has a value of below 0.6 dL/g, the melt viscosity may be too low, and there may be a problem with extrusion moldability.

On the other hand, it is because when the intrinsic viscosity has a value of above 0.85 dL/g, the melt viscosity is too high, and there may be a problem with extrusion moldability.

Therefore, it is more preferable that the intrinsic viscosity has a value within the range of 0.63 to 0.83 dL/g, and even more preferably a value within the range of 0.65 to 0.8 dL/g.

(8) Additives

Furthermore, similarly to the first polyester resin, it is also preferable that the second polyester resin is blended as necessary with various additives such as an oxidation inhibitor, a weather-resistant stabilizer, an antistatic agent, an antifogging agent, a metallic soap, a wax, an antifungal agent, an antibacterial agent, a nucleating agent, a flame retardant, and a lubricating agent (slip agent) in a predetermined amount.

Incidentally, the method of adding the additives is not particularly limited, and a known method can be used.

3. Heat-Shrinkable Polyester Film (1) Mixing Ratio of First Polyester Resin/Second Polyester Resin It is preferable that the weight-based mixing ratio (hereinafter, may be simply referred to as mixing ratio) of the first polyester resin/second polyester resin has a value within the range of 20/80 to 80/20.

The reason for this is that by limiting the mixing ratio of a plurality of polyester resins having different crystallinity to predetermined ranges, the blocking phenomenon when PET bottles are recycled can be suppressed more effectively while maintaining excellent fittability on PET bottles.

Therefore, it is more preferable that the mixing ratio of the first polyester resin/second polyester resin has a value within the range of 25/75 to 75/25, and even more preferably a value within the range of 30/70 to 70/30.

Here, referring to FIGS. 2A and 2B, with regard to the combination of the specific polyester resins constituting the heat-shrinkable polyester film of the present invention, the relationship between the mixing ratio of the first polyester resin/second polyester resin and the evaluation of fittability and the relationship between the mixing ratio and the evaluation of blocking resistance will be described.

Figure 2A:
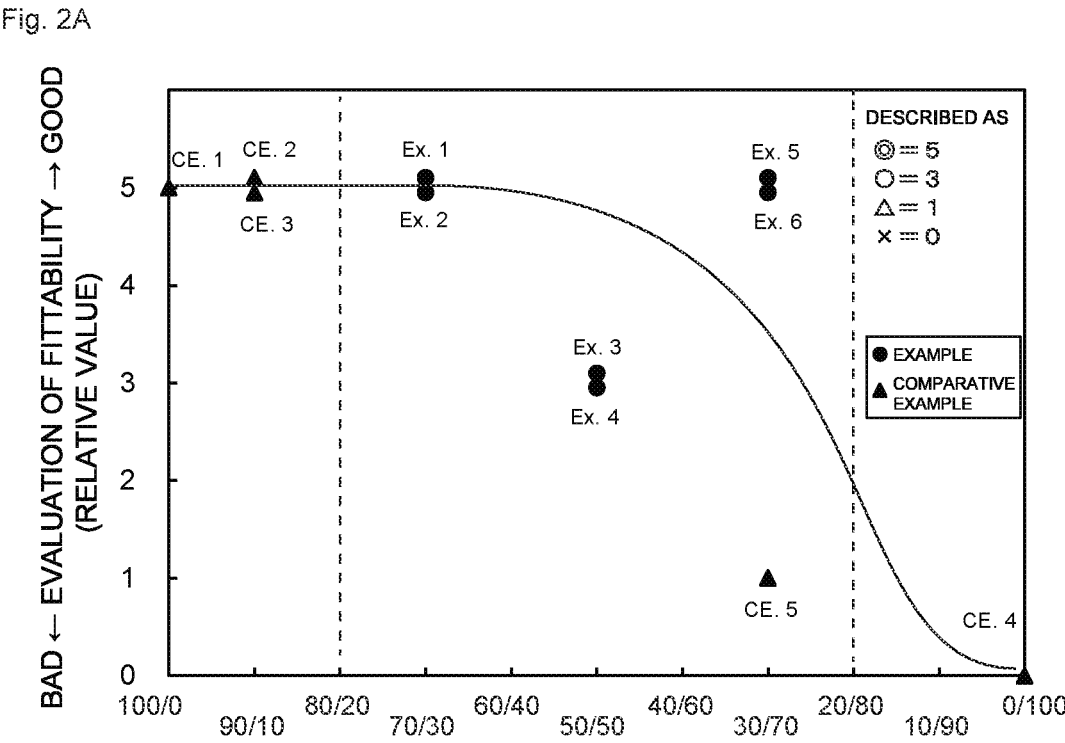
FIGS. 2A and 2B are diagrams provided to explain the relationship between the weight-based mixing ratio of the first polyester resin/second polyester resin constituting each of the heat-shrinkable polyester films and the evaluation of fittability, and the relationship between the weight-based mixing ratio and the evaluation of blocking resistance, respectively.

That is, in FIG. 2A, the axis of abscissa represents the mixing ratio of the first polyester resin/second polyester resin constituting the heat-shrinkable polyester film, and the axis of ordinate represents the evaluation (relative value) of fittability.

Furthermore, in the diagram, Example 1 is described as Ex. 1, while Comparative Example 1 is described as CE. 1, and hereinafter, the same applies.

From the characteristic curve in FIG. 2A, when such mixing ratio is within the range of 100/0 to 70/30, the highest point evaluation of fittability is obtained such that the evaluation point is 5, irrespective of the mixing ratio.

Furthermore, when the mixing ratio is within the range of above 70/30 and 50/50 or less, the evaluation of fittability tends to be slightly lowered, and a tendency that the evaluation point decreases from 5 to about 3 is observed.

When the mixing ratio is within the range of above 50/50 and 20/80 or less, although the evaluation of fittability varies, there is a clear tendency of decrease, and a tendency that the evaluation point decreases to about 1 to 2 is observed.

Therefore, with regard to the heat-shrinkable polyester film of the present invention, it is understood that by adjusting the mixing ratio of the first polyester resin/second polyester resin to a value within a relatively wide range of 20/80 to 80/20, and more preferably to a value within the range of 30/70 to 70/30, a relatively satisfactory or sufficiently acceptable evaluation of fittability is obtained.

Figure 2B:
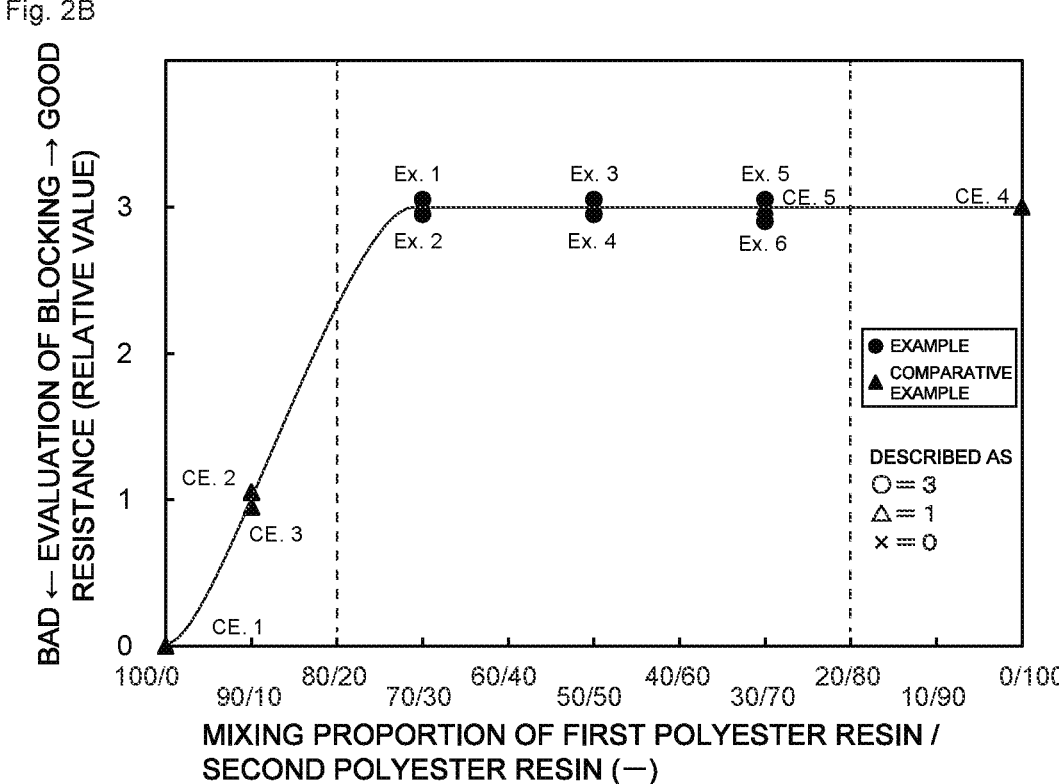

In FIG. 2B, the axis of abscissa represents the mixing ratio of the first polyester resin/second polyester resin constituting the heat-shrinkable polyester film, and the axis of ordinate represents the evaluation (relative value) of blocking resistance.

From the characteristic curve in FIG. 2B, when such mixing ratio is in the range of 100/0 or more and below 80/20, as the mixing ratio of the first polyester resin is smaller, the evaluation of blocking resistance tends to be improved.

Furthermore, when the mixing ratio is within the range of 80/20 to 20/80, a satisfactory evaluation of blocking resistance is obtained regardless of the mixing ratio.

Therefore, with regard to the heat-shrinkable polyester film of the present invention, it is understood that even when the mixing ratio of the first polyester resin/second polyester resin has a value within a relative wide range of at least 20/80 to 80/20, and more preferably a value within the range of 30/70 to 70/30, satisfactory or sufficiently acceptable blocking resistance is obtained.

Figure 3:
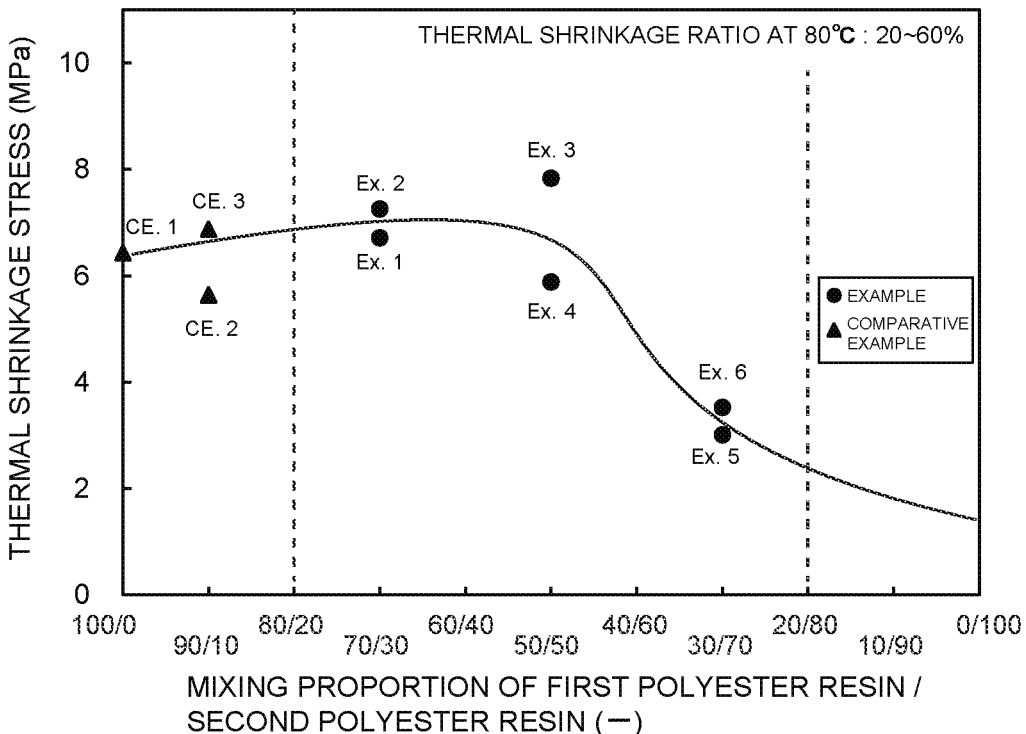
FIG. 3 is a diagram provided to explain the relationship between the mixing ratio of the first polyester resin/second polyester resin and the thermal shrinkage stress.

In addition to that, FIG. 3 shows the relationship between the mixing ratio of the first polyester resin/second polyester resin and the thermal shrinkage stress (80° C.) of the heat-shrinkable polyester film.

However, since the thermal shrinkage stress at 80° C. is strongly affected by the thermal shrinkage ratio at 80° C., in FIG. 3, the description is limited to the measurement data of the Examples and the like in which the thermal shrinkage ratio at 80° C. is within the range of 20% to 60%.

From the characteristic curve in FIG. 3, it is understood that even when such mixing ratio has a value within a relatively wide range of 20/80 to 80/20, and more preferably a value within the range of 30/70 to 70/30, the value of thermal shrinkage stress can be controlled to a low value of 8 MPa or less, and effects such as prevention of the deformation of the object to be wrapped or the like can be exhibited.

Figure 4:
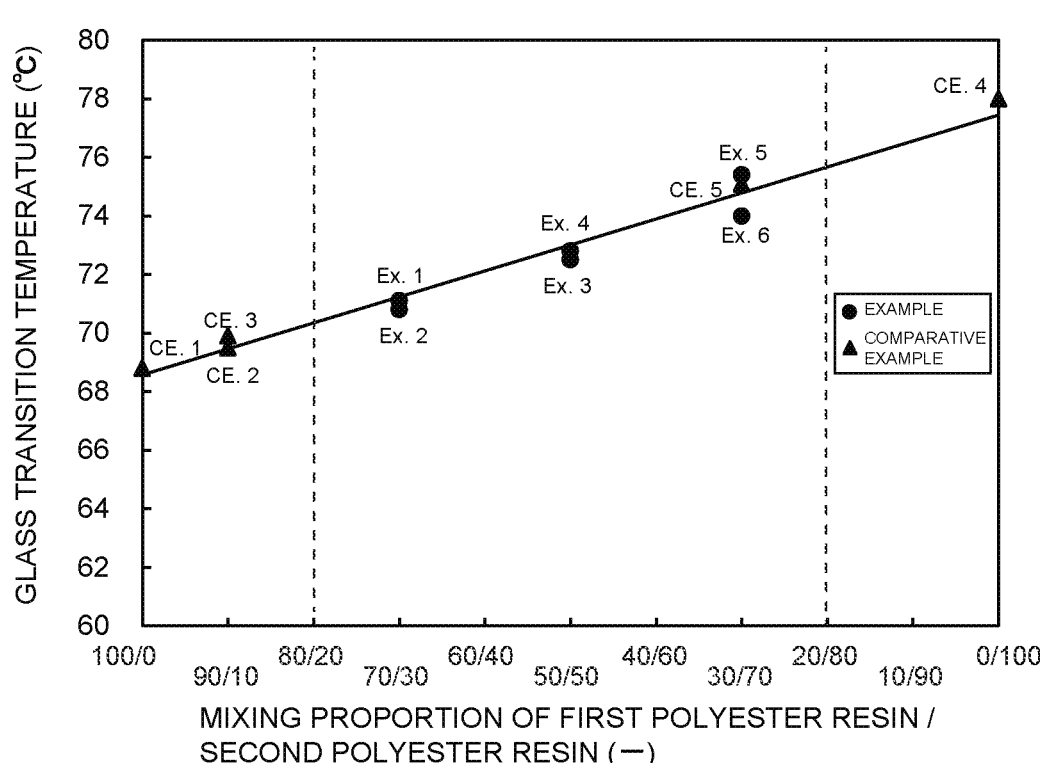
FIG. 4 is a diagram provided to explain the relationship between the mixing ratio of the first polyester resin/second polyester resin and the glass transition temperature.

Furthermore, FIG. 4 shows the relationship between the mixing ratio of the first polyester resin/second polyester resin and the glass transition temperature of the heat-shrinkable polyester film.

From the characteristic curve in FIG. 4, it is understood that even when such mixing ratio has a value within a relatively wide range of 20/80 to 80/20, and more preferably a value within the range of 30/70 to 70/30, the glass transition temperature can be controlled to a higher glass transition temperature quantitatively with very high accuracy, by relatively decreasing the mixing ratio of the first polyester resin, or conversely, relatively increasing the mixing ratio of the second polyester resin.

Figure 5:
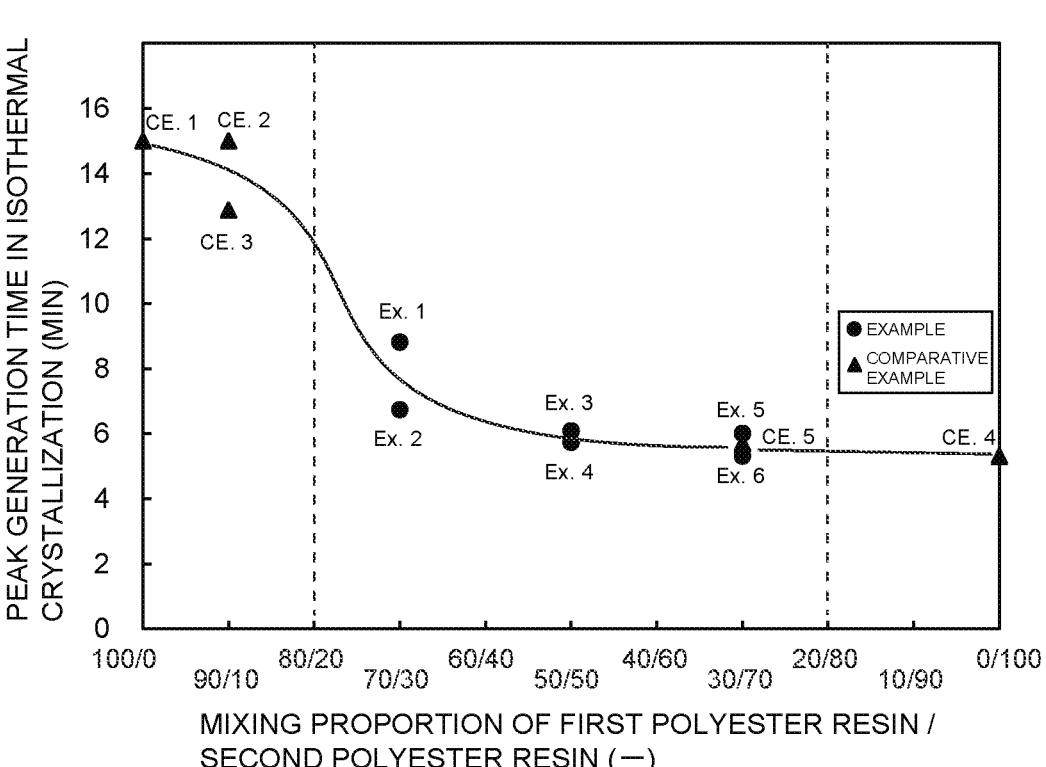
FIG. 5 is a diagram provided to explain the relationship between the mixing ratio of the first polyester resin/second polyester resin and the time of peak generation by isothermal crystallization.

Furthermore, FIG. 5 shows the relationship between the mixing ratio of the first polyester resin/second polyester resin and the peak generation time for the isothermal crystallization that will be described below (hereinafter, may be simply referred to as peak generation time).

From the characteristic curve in FIG. 5, it is understood that even when such mixing ratio has a value within a relatively wide range of 20/80 to 80/20, and more preferably a value within the range of 30/70 to 70/30, the peak generation time can be controlled quantitatively with very high accuracy to a value of more than 5 minutes and 12 minutes or less, and more preferably to a value of 5.5 minutes or more and 9 minutes or less.

Figure 6:
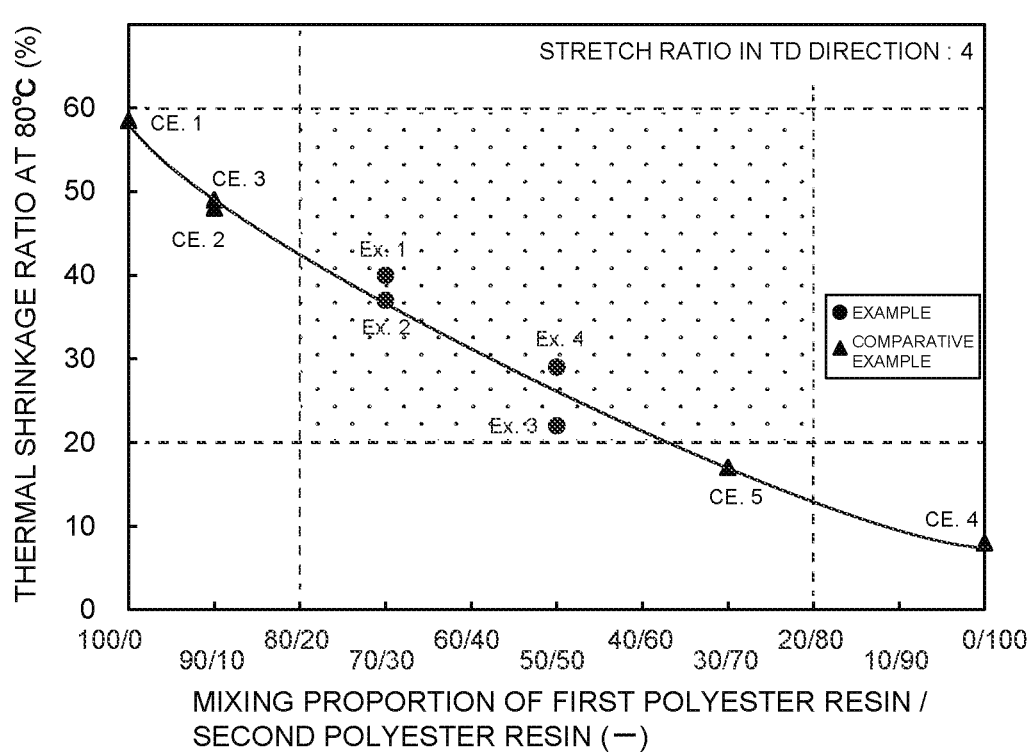
FIG. 6 is a diagram provided to explain the relationship between the mixing ratio of the first polyester resin/second polyester resin and the thermal shrinkage ratio when immersed in hot water at 80° C. for 10 seconds.

FIG. 6 shows the relationship between the mixing ratio of the first polyester resin/second polyester resin and the thermal shrinkage ratio upon immersion in hot water at 80° C. for 10 seconds.

However, since there is a possibility that the thermal shrinkage ratio at 80° C. may be strongly affected by the stretch ratio in the main shrinkage direction (TD direction), in FIG. 6, the description is limited to the measurement data in which the stretch ratio in the main shrinkage direction (TD direction) is 4 times.

From the characteristic curve in FIG. 6, it is understood that even when such mixing ratio has a value within a relatively wide range of 20/80 to 80/20, and more preferably a value within the range of 30/70 to 70/30, the thermal shrinkage ratio at a predetermined temperature can be controlled quantitatively with very high accuracy to a value within the range of 20% to 60%, and more preferably to a value within the range of 25% to 50%.

(2) Peak Generation Time of Isothermal Crystallization

Figure 7:
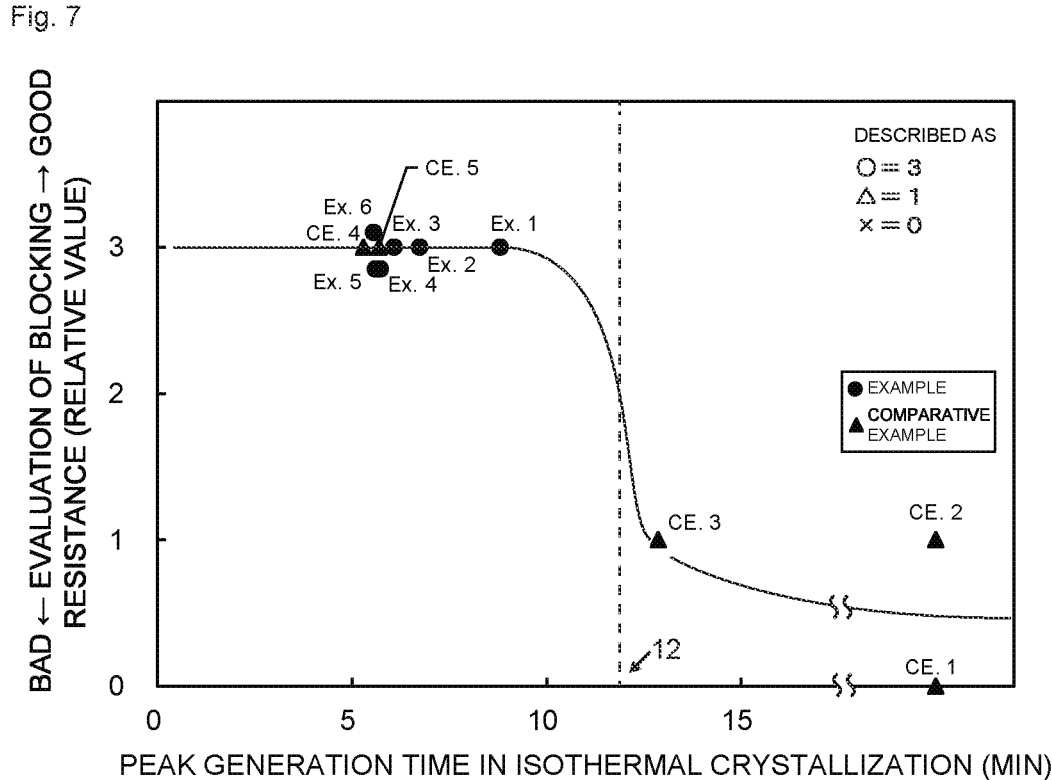
FIG. 7 is a diagram provided to explain the relationship between the time of peak generation at the time of isothermal crystallization and the evaluation of blocking resistance.

As shown in FIG. 7, heat-shrinkable polyester films are provided, in which as the characteristic (C), when isothermal crystallization measurement at 150° C., including a cooling process at a constant temperature (usually −10° C. to 10° C., and for example, 0° C.), is performed by DSC, an exothermic peak appears within 12 minutes from the start of measurement, including a cooling process time at a constant temperature (usually, 1 to 5 minutes, and generally, 5 minutes).

For example, as shown in FIG. 8A, when isothermal crystallization measurement at 150° C., including a cooling process time (5 minutes) at a constant temperature (0° C.), is performed, and an exothermic peak appears after 3.8 minutes from the start of heating at 150° C., the peak generation time is 5+3.8=8.8 minutes.

The reason for this is that as an exothermic peak corresponding to crystallization appears in a relatively short period of time, the blocking phenomenon can be suppressed effectively and quantitatively in a drying process performed when PET bottles wrapped around with the heat-shrinkable polyester film are recycled.

On the other hand, as shown in FIG. 8B, it is because when isothermal crystallization measurement at 150° C., including a cooling process time (5 minutes) at a constant temperature (0° C.), is performed, and an exothermic peak does not appear even after 12 minutes from the start of heating at 150° C., it is determined that crystallization under predetermined conditions is slow.

Therefore, it is because in a drying process carried out when recycling PET bottles and the like, recycled pieces in the form of flakes adhere to each other, and the blocking phenomenon easily occurs, due to the slow crystallization of the heat-shrinkable polyester film.

Thus, as the characteristic (C), it is more preferable that such peak generation time is 10 minutes or less, and even more preferably 9 minutes or less, including a cooling process time at a constant temperature.

Here, returning to FIG. 7, the relationship between the generation time for an exothermic peak caused by isothermal crystallization (including a cooling process time at a constant temperature; hereinafter, may be simply referred to as peak generation time) and the evaluation of blocking resistance in each of the heat-shrinkable polyester films will be described.

That is, in FIG. 7, the axis of abscissa represents the peak generation time, and the axis of ordinate represents the evaluation of blocking resistance (relative value).

From the characteristic curve in FIG. 7, when the peak generation time is 12 minutes or less, a satisfactory evaluation of blocking resistance is obtained; however, when the peak generation time is more than 12 minutes, it can be seen that the evaluation of blocking resistance tends to decrease noticeably.

Therefore, with regard to the heat-shrinkable polyester film of the present invention, it is understood that when the peak generation time at the time of isothermal crystallization has a value of 12 minutes or less, and more preferably a value of more than 5 minutes and 10 minutes or less, the blocking phenomenon can be suppressed effectively and quantitatively.

(3) Heat Quantity Corresponding to Exothermic Peak Area Obtained by Isothermal Crystallization Furthermore, as shown in FIG. 8A, a heat-shrinkable polyester film is provided, in which as the characteristic (D), when isothermal crystallization measurement at 150° C., including a cooling process at a constant temperature, is performed by DSC, the heat quantity corresponding to the exothermic peak area has a value within the range of 5 to 35 J/g.

The reason for this is that when isothermal heating at a predetermined temperature, including a cooling process at a constant temperature, is performed, crystallization occurs according to the crystallinity of the resin in a relatively short period of time (for example, 8.8 minutes from the start, including the cooling process time of 5 minutes).

It is also because by confirming the exhibition of an exothermic peak corresponding thereto, the blocking phenomenon can be suppressed effectively and quantitatively in a drying process carried out when recycling PET bottles wrapped around with the heat-shrinkable polyester film.

That is, it is because when such heat quantity corresponding to the exothermic peak area is below 5 J/g, in a drying process carried out when recycling PET bottles, recycled pieces in the form of flakes adhere to each other, and the blocking phenomenon is likely to occur.

On the other hand, it is because when the heat quantity corresponding to the exothermic peak area is above 35 J/g, this means that the crystalline portion formed by isothermal crystallization is large, and the use applications of the PET resin obtained by recycling may be excessively limited. Therefore, for example, the PET resin may not be applicable to use applications as a heat-shrinkable polyester film.

Incidentally, as shown in FIG. 8B, in Comparative Example 1 and the like, since an exothermic peak does not occur within a predetermined time (for example, within 12 minutes from the start, including the cooling process time of 5 minutes), the blocking phenomenon occurs in the drying process carried out when recycling PET bottles wrapped around with the heat-shrinkable polyester film.

In addition to that, in FIG. 8A, line T represents the temperature profile, and line H represents a characteristic curve corresponding to the heat flux.

Here, referring to FIGS. 9A and 9B, the relationship between the heat quantity corresponding to the exothermic peak area obtained by isothermal crystallization and the evaluation of fittability and the relationship between the heat quantity and the evaluation of blocking resistance in the heat-shrinkable polyester films will be explained.

Figure 9A:
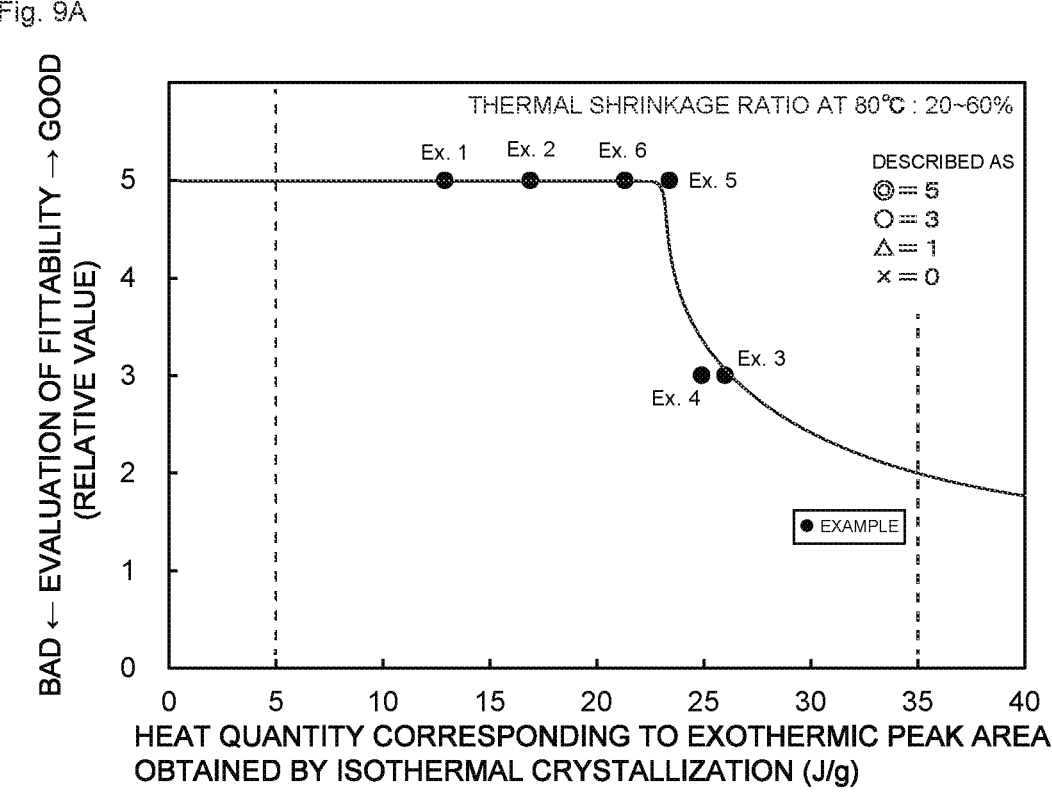
FIGS. 9A and 9B are diagrams provided to explain the relationship between the heat quantity corresponding to the exothermic peak area obtained by isothermal crystallization of heat-shrinkable polyester films and the evaluation of fittability, and the relationship between the heat quantity and the evaluation of blocking resistance, respectively.

That is, FIG. 9A is a diagram provided to explain the relationship between the heat quantity corresponding to the exothermic peak area obtained by isothermal crystallization and the evaluation of fittability, and the axis of abscissa represents the heat quantity (J/g) corresponding to the exothermic peak area obtained by isothermal crystallization, while the axis of ordinate represents the evaluation (relative value) of fittability.

However, although the data in FIG. 9A are based on the Examples and Comparative Examples that will be described below, since the evaluation of fittability is considered to be strongly affected by the thermal shrinkage ratio under predetermined measurement conditions, the description is limited to the data for the measurement and the evaluation of fittability in Examples and the like in which the thermal shrinkage ratio at 80° C. is within the range of 20% to 60%.

Further, from the characteristic curve in FIG. 9A, even when the heat quantity corresponding to the exothermic peak area is in the range of below 5 J/g or is in the range of above 5 J/g and 35 J/g or less, a value of above 2 as a relative value is obtained for the evaluation of fittability.

However, when the heat quantity corresponding to the exothermic peak area is above 35 J/g, the evaluation of fittability has a value of below 2 and tends to decrease.

Therefore, with regard to the combination of specific polyester resins constituting the heat-shrinkable polyester film of the present invention, it is understood that when the heat quantity corresponding to the exothermic peak area has a value within a relatively wide range of 8 to 32 J/g, and more preferably a value within the range of 11 to 29 J/g, satisfactory fittability is obtained effectively and quantitatively.

Figure 9B:
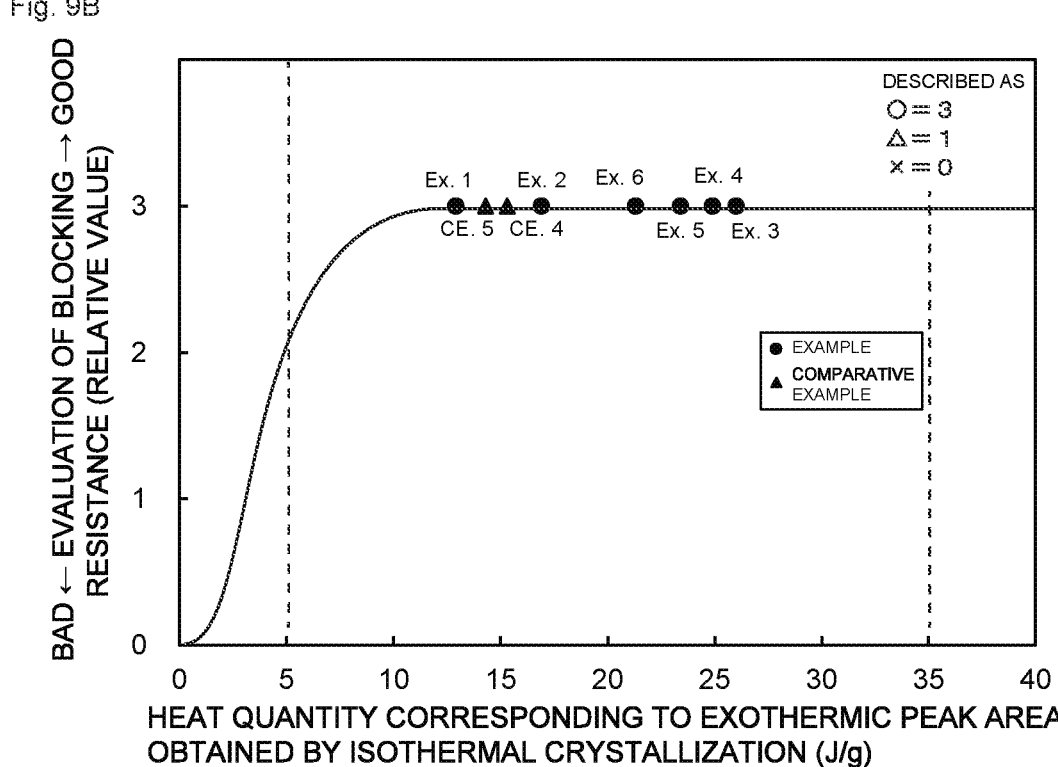

Furthermore, in FIG. 9B, the axis of abscissa represents the heat quantity (J/g) corresponding to the exothermic peak area obtained by isothermal crystallization of heat-shrinkable polyester films, and the axis of ordinate represents the evaluation (relative value) of blocking resistance.

From the characteristic curve in FIG. 9B, when the heat quantity corresponding to the exothermic peak area is in the range of below 5 J/g, it can be seen that the evaluation of blocking resistance tends to decrease.

Furthermore, even when the heat quantity corresponding to the exothermic peak area has a value of 5 to 35 J/g, or a value greater than that, a satisfactory evaluation of blocking resistance tends to be obtained regardless of such heat quantity.

However, when the heat quantity becomes excessively large, the evaluation of fittability may tend to decrease.

Therefore, it is understood that when the heat quantity corresponding to the exothermic peak area has a value within a relatively wide range of 8 to 32 J/g, and more preferably a value within the range of 11 to 29 J/g, each of the heat-shrinkable polyester films has satisfactory fittability, and the blocking phenomenon can also be suppressed effectively and quantitatively.

(4) Thermal Shrinkage Ratio 1

The heat-shrinkable polyester film has the following characteristic (E) in relation to the thermal shrinkage ratio under predetermined temperature conditions.

That is, the thermal shrinkage ratio (may be referred to as thermal shrinkage ratio 1) in the main shrinkage direction (usually, TD direction during manufacturing), which is measured under the thermal shrinkage conditions of immersion in hot water at 80° C. for 10 seconds, has a value within the range of 20% to 60%.

The reason for this is that when the thermal shrinkage ratio in the TD direction obtained by heat-shrinking at a predetermined temperature in this way is controlled to a value within a predetermined range, wrinkles are less likely to occur, generation of a shrinkage cavity is reduced, and as a result, a satisfactory appearance is likely to be obtained.

Furthermore, it is because by limiting the thermal shrinkage ratio in the TD direction at relatively high temperatures, the overall thermal shrinkage of the heat-shrinkable polyester film can be balanced, the thermal shrinkage stress that occurs can be reduced, and pellets can be obtained more stably even when the heat-shrinkable polyester film is recycled together with PET bottles.

Therefore, it is more preferable that such thermal shrinkage ratio in the TD direction has a value within the range of 25% to 55%, and even more preferably a value within the range of 30% to 50%.

Figure 10:
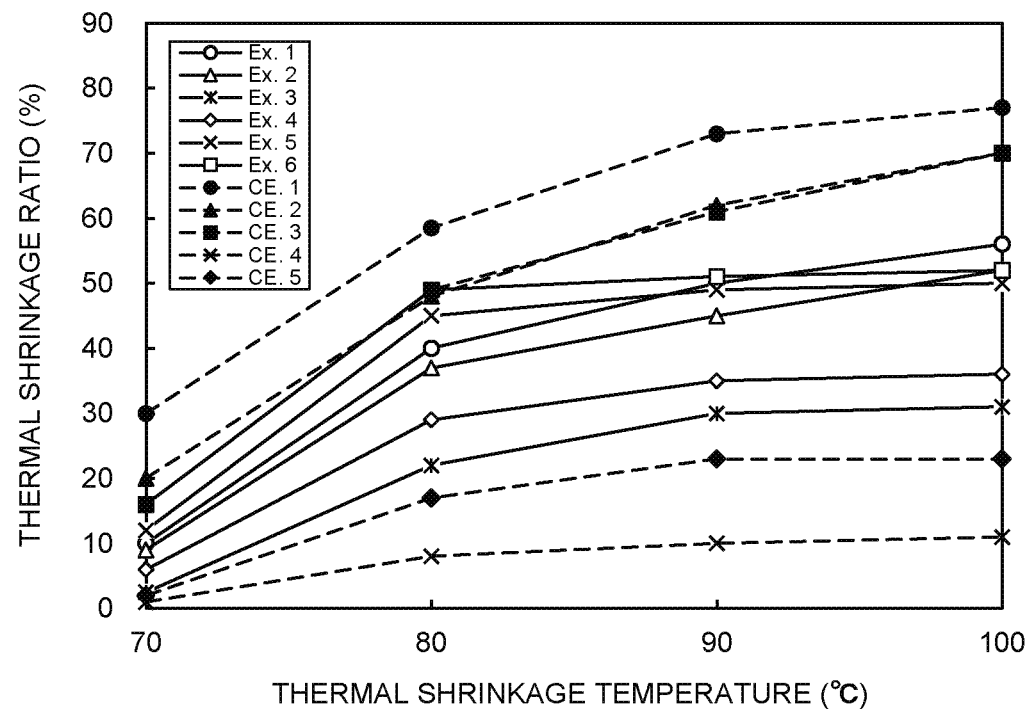
FIG. 10 is a diagram provided to explain the relationship between the thermal shrinkage temperature and the thermal shrinkage ratio of each of the heat-shrinkable polyester films.

Here, FIG. 10 shows the relationship between each thermal shrinkage temperature (70° C., 80° C., 90° C., and 100° C.) and the thermal shrinkage ratio obtained at that temperature in the heat-shrinkable polyester films of Examples 1 to 6 and Comparative Examples 1 to 5.

From FIG. 10, in the heat-shrinkable polyester films of Examples 1 to 6, as the thermal shrinkage temperature increases, the obtained value of the thermal shrinkage ratio also increases, and for example, the value of the thermal shrinkage ratio tends to become significantly large at a thermal shrinkage temperature in the range of 70° C. to 80° C. However, when the thermal shrinkage temperature is higher than 80° C. and is particularly in the range of 90° C. to 100° C., the value of the thermal shrinkage ratio tends to be saturated in the range of about 30% to 50%.

In contrast, at least in the heat-shrinkable polyester films of Comparative Examples 1 to 3, as the thermal shrinkage temperature increases, the obtained value of the thermal shrinkage ratio also increases, and it can be seen that even in the range of 90° C. to 100° C., the obtained value of the thermal shrinkage ratio tends to further increase.

Therefore, with the heat-shrinkable polyester films of Examples 1 to 6 of the present invention, even when the value of the thermal shrinkage temperature varies to some extent, a constant thermal shrinkage ratio can be obtained.

Figure 11A:
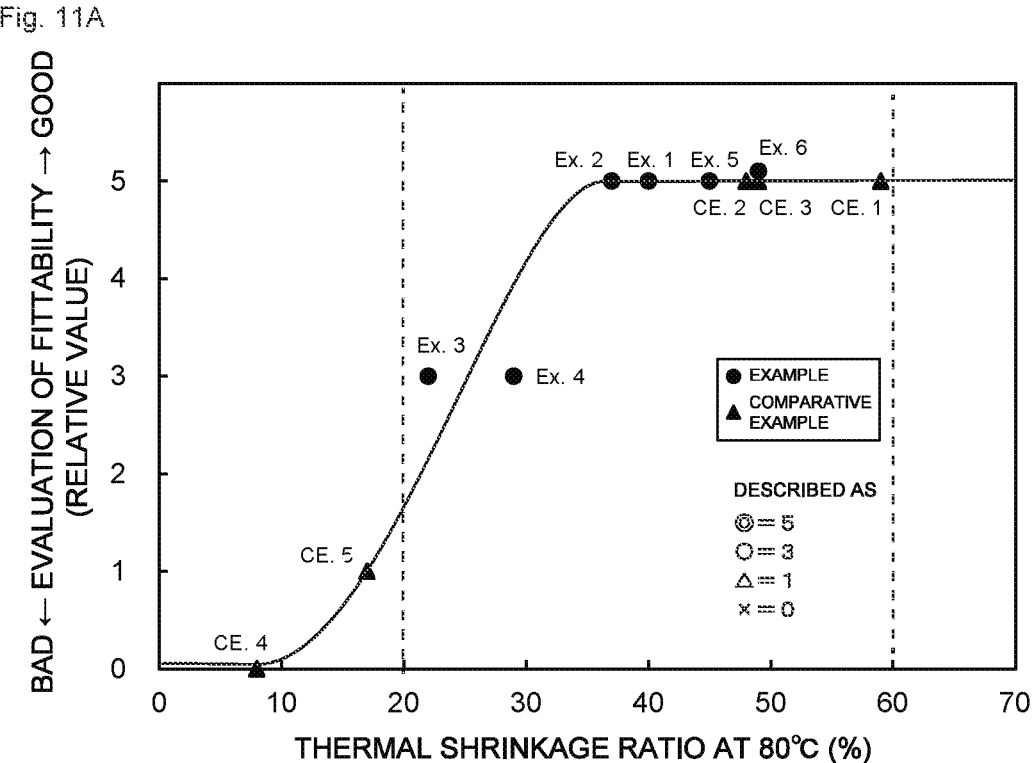
FIGS. 11A and 11B are diagrams provided to explain the relationship between the thermal shrinkage ratio under the shrinkage conditions of being immersed in hot water at 80° C. for 10 seconds and the evaluation of fittability, and the relationship between the thermal shrinkage ratio and the evaluation of blocking resistance, respectively, for each of the heat-shrinkable polyester films.
Figure 11B:
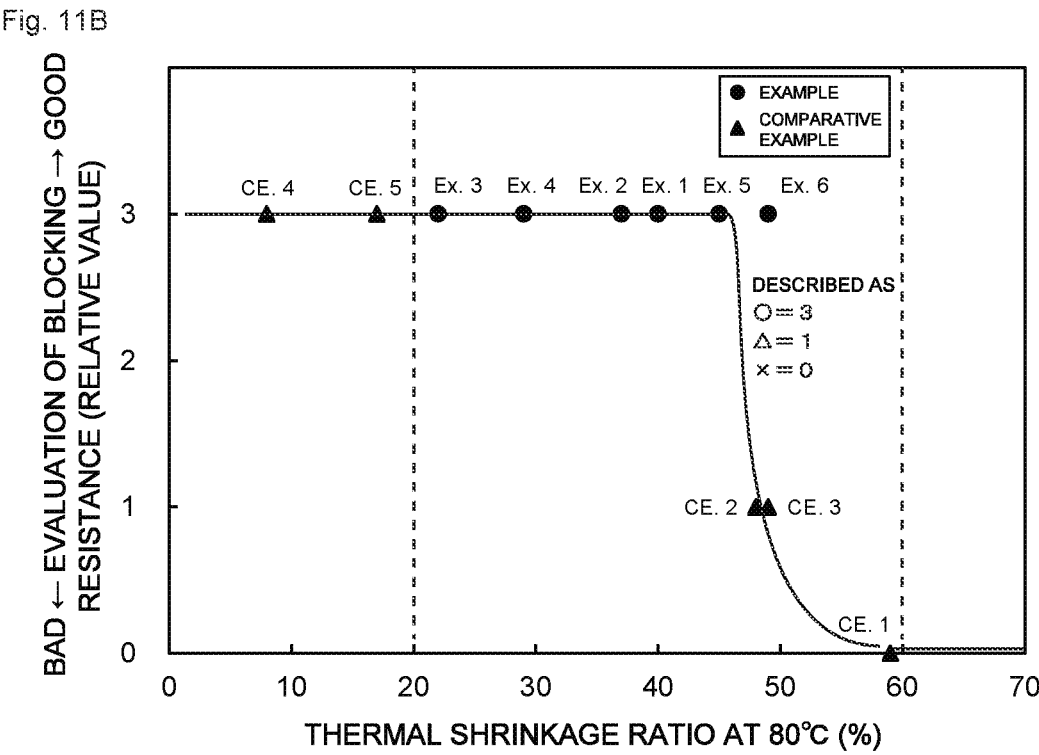

FIGS. 11A and 11B are diagrams showing the relationship between the thermal shrinkage ratio under predetermined shrinkage conditions of the heat-shrinkable polyester films and the evaluation of fittability and the relationship between the thermal shrinkage ratio and the evaluation of blocking resistance.

That is, in FIG. 11A, the axis of abscissa represents the thermal shrinkage ratio (%) of the heat-shrinkable polyester film when immersed in hot water at 80° C. for 10 seconds, and the axis of ordinate represents the evaluation (relative value) of fittability.

From the characteristic curve in FIG. 11A, when such thermal shrinkage ratio is below 20%, the evaluation of fittability tends to be noticeably low.

Furthermore, even when the thermal shrinkage ratio is in the range of 20% to 60%, or above 60%, a satisfactory evaluation of fittability is obtained regardless of the thermal shrinkage ratio at 80° C.

Therefore, with regard to the heat-shrinkable polyester films of the present invention, it is understood that when the thermal shrinkage ratio has a value within the range of 20% to 60%, and more preferably a value within the range of 25% to 50%, a satisfactory evaluation of fittability is stably obtained.

Furthermore, in FIG. 11B, the axis of abscissa represents the thermal shrinkage ratio (%) of the heat-shrinkable polyester film when immersed in hot water at 80° C. for 10 seconds, and the axis of ordinate represents the evaluation (relative value) of blocking resistance.

From the characteristic curve in FIG. 11B, even when such thermal shrinkage ratio is below 20%, a satisfactory evaluation of blocking resistance is obtained, and when the thermal shrinkage ratio is in the range of 20% or more and below 50%, similarly a satisfactory evaluation of blocking resistance is obtained.

On the other hand, when the thermal shrinkage ratio is above 50% or up to about 60%, the evaluation of blocking resistance is noticeably decreased; however, an evaluation of blocking resistance to the extent that is usable in practice is obtained.

Therefore, it is understood that with regard to each of the heat-shrinkable polyester films of the present invention, when the thermal shrinkage ratio has a value within the range of 20% to 60%, and more preferably a value within the range of 25% to 50%, the blocking phenomenon can be suppressed effectively and quantitatively.

(5) Thermal Shrinkage Ratio 2

As the characteristic (F), it is preferable that the thermal shrinkage ratio (may be referred to as thermal shrinkage ratio 2) in a direction (usually, MD direction during manufacturing) orthogonally intersecting the main shrinkage direction, which is measured under the thermal shrinkage conditions of immersion in hot water at 80° C. for 10 seconds, has a value within the range of –3% to 10%.

The reason for this is that when the thermal shrinkage ratio in the MD direction, which is measured under predetermined thermal shrinkage conditions, is controlled to a predetermined range, wrinkles are less likely to occur, the generation of shrinkage cavity is reduced, and as a result, a satisfactory appearance is likely to be obtained.

Furthermore, it is because by limiting the thermal shrinkage ratio in the MD direction, the overall thermal shrinkage of the heat-shrinkable polyester film can be balanced, the thermal shrinkage stress that occurs can be reduced, and even when the heat-shrinkable polyester film is recycled together with PET bottles, the occurrence of the blocking phenomenon can be suppressed, while recycled pellets can be obtained more quantitatively and stably.

Therefore, it is more preferable that such thermal shrinkage ratio in the MD direction as the characteristic (F) has a value within the range of –2% to 8%, and even more preferably a value within the range of 0% to 5%.

(6) Thermal Shrinkage Stress

Furthermore, as the characteristic (G), it is preferable that the thermal shrinkage stress in the main shrinkage direction, which is measured under the thermal shrinkage conditions of immersion in hot water at 80° C. for 10 seconds, has a value of 8 MPa or less.

The reason for this is that when such thermal shrinkage stress has a value of above 8 MPa, thermal shrinkage stress similar to that of heat-shrinkable polyvinyl chloride films may not be obtained, and as a result, general usability that can cope with various PET bottles ranging from thin-walled bottles to thick-walled bottles may not be obtained.

Therefore, it is more preferable that the thermal shrinkage stress has a value within the range of 1 to 7 MPa, and even more preferably a value within the range of 2 to 6 MPa.

Furthermore, the thermal shrinkage stress at 80° C. can be calculated by dividing the thermal shrinkage force (N/15 mm) at 85° C. for a long test specimen, which is measured by using a film thermal shrinkage tester according to ISO 14616-1997, by the thickness of the test specimen.

(7) Thickness and Haze Value (7)-1 Thickness

It is preferable that the thickness of the heat-shrinkable polyester film can be changed according to the various forms of PET bottles; however, usually the thickness has a value within the range of 20 to 100 μm.

The reason for this is that when such thickness of the heat-shrinkable polyester film has a value of below 20 μm, handling may be difficult, and the breaking strength and the like may be noticeably deteriorated.

On the other hand, it is because when the thickness of the heat-shrinkable polyester film has a value of above 100 μm, in a case of being heated to a predetermined temperature, the heat-shrinkable polyester film may not undergo thermal shrinkage uniformly, or it may be difficult to manufacture the film to have a uniform thickness.

Therefore, it is more preferable that the thickness of the heat-shrinkable polyester film has a value within the range of 25 to 70 μm, and even more preferably a value within the range of 30 to 50 μm.

Incidentally, the thickness of the heat-shrinkable polyester film can be measured according to ISO 4593 by using a micrometer (manufactured by Mitutoyo Corporation, product name "Thickness Gauge 547-401").

(7)-2 Haze Value

With regard to the heat-shrinkable polyester film before shrinking, it is also preferable that the haze value measured according to ASTM D1003 has as value of 10% or less.

The reason for this is that by limiting the haze value to be equal to or less than a predetermined value, alignment with respect to the PET bottle or the like and contents examination are facilitated, while on the other hand, a PET bottle including a heat-shrinkable polyester film that is excellent in terms of transparency, appearance characteristics, decorativeness, and the like not only before thermal shrinkage but also after thermal shrinkage, can be obtained.

Conversely, it is because when such haze value is above 10%, alignment with respect to the PET bottle or the like and contents recognizability may be deteriorated, and even when a decorative layer is provided, color developing properties and the like may be noticeably deteriorated.

However, when the haze value is excessively small, the types, blending amounts, and the like of the usable polymerization components are limited, it may be difficult to control the manufacturing process, and the production efficiency may be excessively lowered.

Therefore, it is more preferable that the haze value has a value within the range of 1% to 8%, and even more preferably a value within the range of 2% to 5%.

(8) Functional Layer and Additives (8)-1 Functional Layer

It is also preferable that the heat-shrinkable polyester film has a functional layer for imparting various functions to the surface or an inner face as necessary, to the extent that does not impair the purpose and the like of the present invention.

Examples of such a functional layer include coating layers for imparting surface lubricity, contamination resistance, weather resistance, and the like; a transfer layer; and a print layer for imparting design properties.

Among these, particularly a coating layer using a surfactant is a preferable embodiment as a functional layer because the coating layer greatly contributes to the improvement of antistatic properties and surface lubricity.

For example, as shown in FIG. 1B, it is also preferable to laminate other resin layers 10a and 10b including at least one of these various additives on one surface or both surfaces of the heat-shrinkable polyester film 10.

In that case, it is preferable that when the thickness of the heat-shrinkable polyester film is taken as 100%, the single layer thickness or the total thickness of the other resin layers that are additionally laminated usually has a value within the range of 0.1% to 10%.

The resin as a main component constituting the other resin layers may be a polyester resin similar to that of the heat-shrinkable polyester film, or it is preferable that the resin is at least one of an acrylic resin, an olefin resin, a urethane resin, a rubber resin, and the like, which are different from a polyester resin.

In addition, it is also preferable that the heat-shrinkable polyester film has a multilayer structure, and a shrinkage ratio adjusting layer 10c is provided on the surface of the heat-shrinkable polyester film 10 so as to further promote a hydrolysis preventing effect and mechanical protection, or to make the shrinkage ratio of the heat-shrinkable polyester film uniform within the plane as shown in FIG. 1C.

Such shrinkage ratio adjusting layer can be laminated as a predetermined layer formed from a polyester resin or the like by using an adhesive, a coating method, a heating treatment, or the like depending on the shrinkage and the like of the heat-shrinkable polyester film.

(8)-2 Additives

Furthermore, it is also preferable to blend a predetermined amount (for example, at a proportion of 0.01 to 10 parts by weight of the total amount) of various additives such as an oxidation inhibitor, a weather-resistant stabilizer, an anti-static agent, an antifogging agent, a metallic soap, a wax, an antifungal agent, an antibacterial agent, a nucleating agent, a flame retardant, and a lubricating agent (slipping agent), or to apply a paint (ink), a wettability improver, an antistatic agent, or the like, as necessary, into the inner part or on the surface of the heat-shrinkable polyester film.

Particularly, it is preferable to incorporate an inorganic lubricating agent and an organic lubricating agent, or either one of them, so as to improve the slipperiness of the heat-shrinkable polyester film and to enable easy winding or the like when formed into a long roll.

More specifically, examples of the inorganic lubricating agent include calcium carbonate particles, silica particles, glass particles, and microparticles formed from at least one of zeolite, talc, kaolin, and the like.

Furthermore, examples of the organic lubricating agent include microparticles formed from at least one of cross-linked polymethyl methacrylate, crosslinked polystyrene, silicone rubber, silicone copolymer, polyamide, a condensed resin having a triazine ring, and the like, and above all, a more preferred organic lubricating agent is microparticles formed from silicone rubber or silicone copolymer, from the viewpoint of being appropriately deformable and being capable of exhibiting satisfactory blocking resistance.

Second Embodiment

A second embodiment is a method for manufacturing the heat-shrinkable polyester film of the first embodiment.

Figure 12:
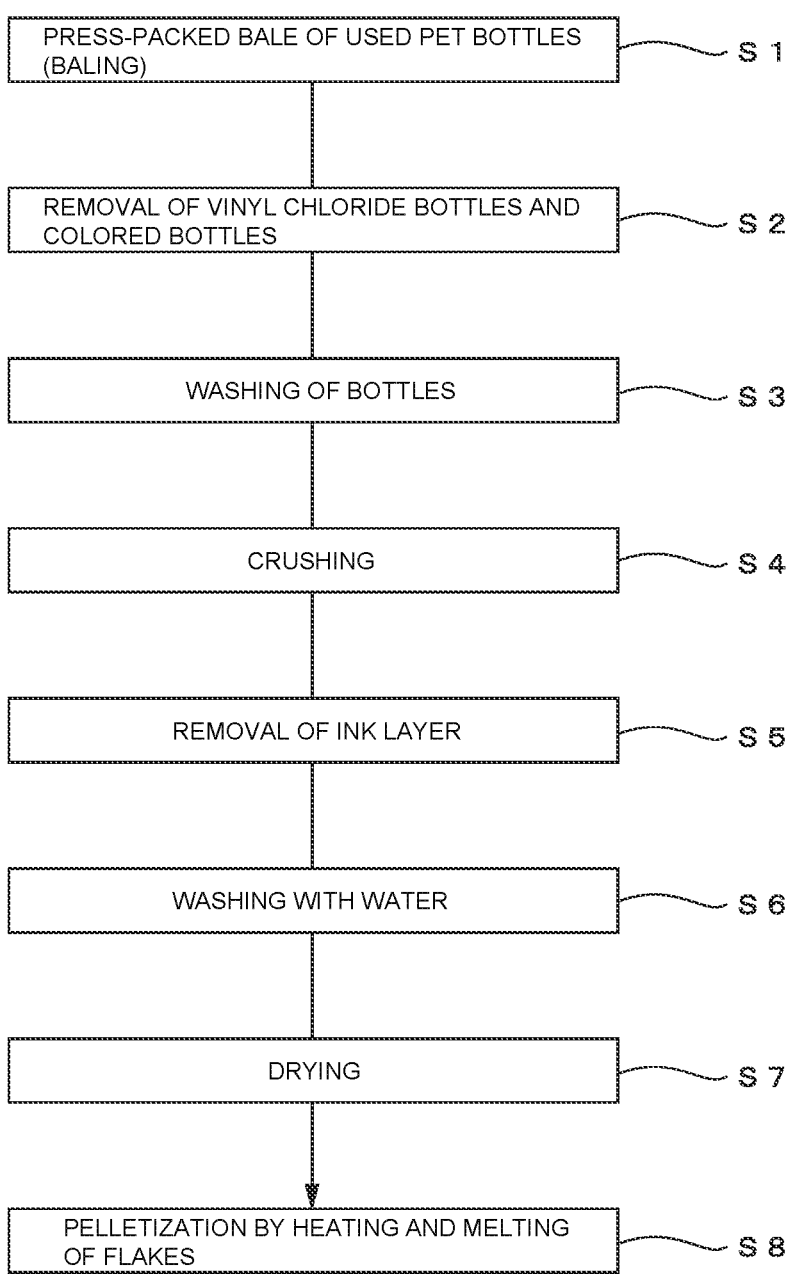
FIG. 12 is a diagram for explaining a recycling process for PET bottles covered with a heat-shrinkable polyester film.
Figure 13A:
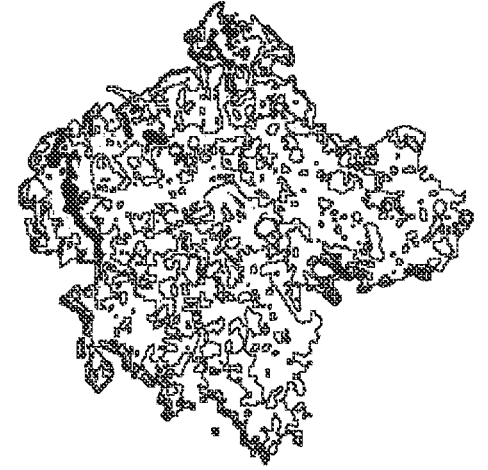
FIG. 13A is an outline diagram illustrating a state in which the blocking phenomenon occurs in a recycling process for PET bottles covered with a conventional heat-shrinkable polyester film.
Figure 13B:
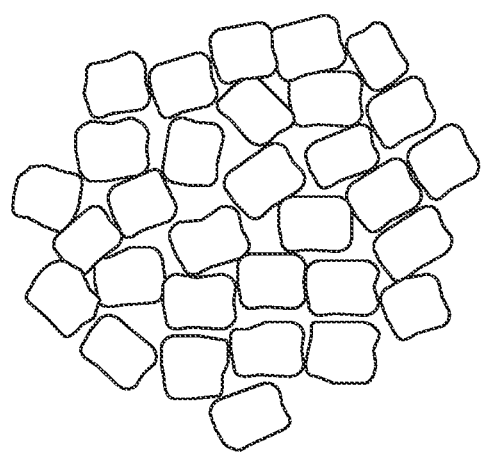
FIG. 13B is an outline diagram of recycled pellets obtained in a recycling process for PET bottles in which the blocking phenomenon does not occur.

Furthermore, as shown in FIG. 12, a recycling process for PET bottles covered with the heat-shrinkable polyester film will be described together.

The method will be divided into each step and specifically described below.

1. Ingredient Materials Preparation and Mixing Step

As ingredient materials, a first polyester resin and a second polyester resin, and optionally additives and other additive resins are prepared.

Next, it is preferable to put the above-described ingredient materials into a stirring container while weighing the ingredient materials, and to mix and stir the ingredient materials by using a stirring device until they become uniform.

2. Raw Sheet Production Step

Next, it is preferable that the obtained ingredient material is dried into an absolutely dry state by heating to a predetermined temperature (usually, a temperature lower by 10° C. from the crystallization temperature).

Next, it is preferable to perform extrusion molding (T-die method), an inflation method, or a cast molding method and produce a raw sheet having a predetermined thickness.

More specifically, it is preferable to perform extrusion molding for the ingredient material by using a predetermined extruder, for example, under the conditions with an extrusion temperature of 245° C. and obtain a raw sheet having a predetermined thickness (usually, 200 to 300 μm).

3. Production of Heat-Shrinkable Polyester Film

Next, it is preferable that the obtained raw sheet is heated and pressed while being moved over rolls or between rolls by using a heat-shrinkable film manufacturing apparatus (tenter) to produce a heat-shrinkable polyester film.

Then, as a stretching treatment method for exhibiting such shrinkability, it is preferable to employ an inflation method, a roll stretching method, a tenter stretching method, and combinations thereof.

However, from the viewpoint of obtaining more satisfactory productivity, sheet molding according to a cast molding method and a combination of roll stretching and tenter stretching are more suitable.

Furthermore, on the occasion of producing the heat-shrinkable polyester film, it is preferable that polyester molecules constituting the heat-shrinkable polyester film are crystallized into a predetermined structure by basically expanding the film width at a predetermined stretching temperature and a stretch ratio and stretching the film in a predetermined direction while heating and pressing.

Then, by solidifying the film in that state, a heat-shrinkable polyester film having thermal shrinkability that can be used as a decoration, a label, or the like can be produced.

Incidentally, it is usually preferable that a film raw sheet is manufactured by a T-die method, an inflation method, or the like, subsequently the film raw sheet is heated to a temperature equal to or higher than the glass transition temperature of the resin, and the film raw sheet is stretched 3 to 8 times, and preferably about 4 to 6 times, in the main stretching direction (width direction of the film raw sheet, that is, TD direction).

4. Heat-Shrinkable Polyester Film Inspection Step

For the produced heat-shrinkable polyester film, it is preferable to provide a predetermined inspection step so that the following characteristics and the like can be measured continuously or intermittently.

That is, by measuring the following characteristics and the like by a predetermined inspection step and checking whether the characteristics have values within predetermined ranges, a heat-shrinkable polyester film having more uniform shrinkability and the like can be provided.

1) Visual inspection of the appearance of the heat-shrinkable polyester film

2) Measurement of thickness variation

3) Measurement of tensile strength (ASTM D882)

4) Measurement of tensile elongation (ASTM D882)

5) Inspection of surface slipperiness (ASTM D1894)

6) Measurement of specific gravity (ASTM D792)

7) Ring crush test (TAPPI T882)

8) Measurement of tear strength (ASTM D1922)

5. Heat-Shrinkable Polyester Film Wrapping Step

For the obtained heat-shrinkable polyester film, it is preferable that a step of wrapping PET bottles with the film is carried out by the following procedure.

1) PET bottles in a state of being filled with commercially available drinking water are prepared.

2) Next, the edges in the width direction of the heat-shrinkable polyester film are welded with an impulse sealer (manufactured by FUJI IMPULSE CO., LTD.) to obtain a tubular-shaped label.

3) Next, the prepared cylindrical-shaped PET bottle is covered with this tubular-shaped label.

4) As an example, the covered PET bottle is placed on a belt conveyor and moved inside a steam tunnel maintained at 80° C. at a passing speed of 6 m/min, and the tubular-shaped label is thermally shrunk so as to closely adhere to the cylindrical-shaped PET bottle.

Incidentally, an infrared lamp, a hot bath, and the like can also be used as other heating jigs, instead of the steam tunnel or in combination with the steam tunnel.

6. PET Bottle Recycling Process

Referring to the flow chart of FIG. 12, an example of a recycling process for PET bottles after use in a state of being wrapped around with a heat-shrinkable polyester film will be described more specifically.

In FIG. 12, the step represented by S1 is a step of subjecting used PET bottles to compression packaging, so-called press-packed bale. Through such a step, satisfactory storability, transportability, and the like of used PET bottles can be secured.

Next, the step represented by S2 is a step of loosening the once-baled used PET bottles into lumps having a length of several centimeters by a debaling apparatus, and at the same time, sorting out and removing vinyl chloride bottles, colored bottles, and the like. Through such a step, only the used PET bottles as a target can be recycled efficiently.

Next, the step represented by S3 is a step of washing the used PET bottles and removing contaminants or attachments.

Next, the step represented by S4 is a step of cutting the washed PET bottles into flakes having a length of several millimeters using a predetermined crushing apparatus. Through such a crushing step, PET bottles can be cut into flakes having an average particle size of several millimeters and a thickness of micrometers, and satisfactory handleability in the subsequent step can be obtained.

Next, the step represented by S5 is a step of removing an ink layer provided on the heat-shrinkable film. For example, the step is a step of immersing the flakes obtained in S4 in an ink removal liquid, such as alkaline hot water such as an aqueous solution of sodium hydroxide and removing the ink layer. That is, the occurrence of the blocking phenomenon caused by the ink layer can be further reduced in the subsequent drying step.

Next, the step represented by S6 is a step of separating the ink and the ink removal liquid and washing separated flakes.

Next, the step represented by S7 is a step of drying the washed flakes obtained in S6. By drying in this way, the handleability can be further improved in the subsequent step.

Lastly, the step represented by S8 is a step of heating and melting the flakes obtained in S7 and producing, for example, recycled pellets having an average particle size of 1 to 8 mm by using a pelletizer or the like. By producing recycled pellets having a uniform average particle size in this way, reutilization in various use applications can be facilitated.

In this way, in comparison with a conventional method, since a step of manually removing the heat-shrinkable polyester film wrapped on PET bottles in advance or by removing the film after crushing can be omitted, the number of steps is reduced, the production cost is reduced, and it is highly advantageous economically as well as in view of shortening the recycle time.

Therefore, with the heat-shrinkable polyester film of the present invention, even when the film is wrapped on PET bottles, the blocking phenomenon can be suppressed, and recycled pellets can be produced efficiently and economically.

EXAMPLES

Hereinafter, the heat-shrinkable polyester film of the present invention will be described in more detail based on Examples.

However, the scope of rights of the present invention shall not be narrowed by the description of the Examples without any particular reason.

Furthermore, the amorphous polyester resin and crystalline polyester resin (low-crystalline polyester resin) used in the Examples are as follows.

(First Polyester Resin: PET1)

An amorphous polyester resin composed of dicarboxylic acid: 100 mol % of terephthalic acid, and diol: 63 mol % of ethylene glycol, 24 mol % of 1,4-cyclohexanedimethanol, and 13 mol % of diethylene glycol Glass transition temperature (Tg): 69° C.

Melting point: None (Second Polyester Resin: PET2)

Low-crystalline polyester resin, which is homo-PET, composed of dicarboxylic acid: 100 mol % of terephthalic acid, and diol: 100 mol % of ethylene glycol Glass transition temperature (Tg): 78° C.

Melting point: 253° C.

(Other Second Polyester Resin: PET3)

Crystalline polyester resin, which is a post-consumer recycled polyester resin (PCRP), composed of dicarboxylic acid: 98 mol % of terephthalic acid and 2 mol % isophthalic acid, and diol: 97 mol % of ethylene glycol and 3 mol % of diethylene glycol Glass transition temperature (Tg): 78° C.

Melting point: 251° C.

Example 1

1. Production of Heat-Shrinkable Polyester Film

PET1 as a first polyester resin and PET2 as a second polyester resin were each prepared.

Next, 700 g of PET1, 300 g of PET2, and 10 g of a lubricating agent were weighed and put into a stirring container, and the mixture was uniformly mixed to obtain a raw material for formation.

Next, this raw material for formation was subjected to extrusion molding under the conditions of an extrusion temperature of 245° C. by using a vented twin-screw extruder, and a raw sheet having a thickness of 250 μm was obtained.

Finally, a heat-shrinkable polyester film having a thickness of 40 μm and a thickness variation of below 5% was obtained from the raw sheet by using a heat-shrinkable film manufacturing apparatus at a preheating temperature of 120° C., a stretching temperature of 84° C., a thermal fixing temperature of 86.5° C., and stretch ratios (MD direction: 1.06 times, TD direction: 4 times).

2. Evaluation of Heat-Shrinkable Polyester Film (1) Peak Generation Time of Isothermal Crystallization The obtained heat-shrinkable polyester films were subjected to a heat treatment by the following pre-process by using a DSC (manufactured by PerkinElmer, Inc., input compensation type double-furnace differential scanning calorimeter, product name "DSC8500"; hereinafter, the same), and then was subjected to isothermal crystallization measurement. That is, based on a DSC chart obtained in the isothermal crystallization measurement, the time taken from the start to the generation of an exothermic peak caused by isothermal crystallization, including a cooling process (5 minutes) at a constant temperature (0° C.), was measured.

(Pre-Process)

1) A measurement sample was isothermally maintained under the conditions of 30° C. for 1 minute.

2) Next, the temperature was increased from 30° C. to 300° C. at a temperature increase rate of 750° C./min.

3) Next, the measurement sample was isothermally maintained at 300° C. for 5 minutes.

4) Next, the measurement sample was rapidly cooled to 0° C.

(Isothermal Crystallization Measurement)

1) The measurement sample was isothermally maintained at 0° C. for 5 minutes.

2) Next, the temperature was increased from 0° C. to 150° C. at a temperature increase rate of 750° C./min.

3) Next, the measurement sample was isothermally maintained at 150° C. for at least 10 minutes or more (15 minutes or more including the pre-process) and was crystallized.

(2) Heat Quantity Corresponding to Exothermic Peak Area by Isothermal Crystallization Based on a DSC chart obtained by measurement of a peak generation time in the isothermal crystallization of the above-described (1), the generated heat quantity corresponding to the peak area of isothermal crystallization was measured.

(3) Thermal Shrinkage Ratio

For the obtained heat-shrinkable polyester films, the thermal shrinkage ratio was measured according to ASTM D2732-08.

That is, a heat-shrinkable polyester film was cut into a quadrilateral shape having a length of 100 mm along the main shrinkage direction (TD direction) and a length of 100 mm along the direction orthogonally intersecting the main shrinkage direction (MD direction), and this was used as a measurement sample.

Next, measurement samples of the heat-shrinkable polyester films were each immersed for 10 seconds in a constant temperature bath accommodating hot water at 80° C. and were thermally shrunk.

Next, the thermal shrinkage ratios (%) in the main shrinkage direction and the direction orthogonally intersecting the main shrinkage direction were each calculated according to the following Formula (1) from the dimensional changes before and after the heating treatment, at each temperature.

$$\text{Thermal shrinkage ratio (\%)} = \frac{100 \text{ mm} - \text{Length of film after thermal shrinkage}}{100 \text{ mm}} \times 100 \tag{1}$$

(4) Thermal Shrinkage Force and Thermal Shrinkage Stress

For the obtained heat-shrinkable polyester films, the thermal shrinkage force was measured according to ISO 14616-1997.

That is, an obtained heat-shrinkable polyester film was cut into a short strip having a length of 90 mm along the main shrinkage direction and a length of 15 mm along the direction orthogonally intersecting the main shrinkage direction, and that was used as a test specimen.

Next, the thermal shrinkage force (N/15 mm) of the test specimen when immersed in hot water at 80° C. for 10 seconds was measured by using a film thermal shrinkage tester.

Next, the obtained thermal shrinkage force was divided by the thickness (40 μm) to obtain the thermal shrinkage stress (MPa) at 80° C.

(5) Blocking Resistance

For the obtained heat-shrinkable polyester films, the blocking resistance was evaluated by the following procedure according to APR Document Code: PET-S-08.

1) A tubular-shaped bottle was wrapped around with a heat-shrinkable polyester film, and the container was emptied and washed.

Next, the bottle in a state of being wrapped around with the heat-shrinkable polyester film was crushed into flaky objects having a diameter of 12.5 mm or less.

2) Next, 1 kg of the crushed flaky objects were placed in a heat-resistant container, and the flaky objects were heated in an oven at 210° C.

3) Next, after a lapse of 90 minutes, the heat-resistance container containing the flaky objects was taken out from the oven and was naturally cooled to reach room temperature.

4) Next, the flaky objects were classified by using a 12.5-mm mesh sieve.

5) Thereafter, the mass of agglomerates that could not pass through the sieve was measured, and the agglomeration ratio (%) was calculated from the following Formula (2).

$$\text{Agglomeration ratio}\,(\%) = \text{Mass of agglomerates}\,(\text{kg})/1\,(\text{kg}) \times 100 \quad (2)$$

6) Based on the calculated agglomerates, evaluation of the blocking resistance was performed according to the following criteria.

○ (Good): The mass of the agglomerates has a value of below 5%.

Δ (Fair): The mass of the agglomerates has a value of 5% or more and below 10%.

× (Bad): The mass of the agglomerates has a value of 10% or more.

(6) Fittability

For the obtained heat-shrinkable polyester films, the fittability to PET bottles was evaluated according to the following criteria.

That is, ten cylindrical-shaped PET bottles in a state of being filled with commercially available drinking water were prepared (trade name: EVIAN, volume: 500 ml).

Next, the edges in the width direction of a heat-shrinking polyester film were welded with an impulse sealer (manufactured by FUJI IMPULSE CO., LTD.), and ten tubular-shaped labels were produced so as to correspond to the cylindrical-shaped PET bottles.

Next, each of the ten cylindrical-shaped PET bottles was covered with each of the ten tubular-shaped labels thus obtained to be used as measurement samples.

Next, the measurement samples were placed on a belt conveyor and moved inside a steam tunnel maintained at 85° C. at a passing speed of 6 m/min, and the tubular-shaped labels were thermally shrunk so as to closely adhere to the cylindrical-shaped PET bottles.

Lastly, the finish quality in a state in which the tubular-shaped labels were thermally shrunk, that is, the presence or absence of defects such as wrinkles, insufficient shrinkage, label folding-in, and shrinkage whitening was observed by visual inspection, and the fittability of the heat-shrinkable polyester film was evaluated according to the following criteria.

⊙ (Very good): No defects are found in the ten measurement samples.

○ (Good): Defects are found at one or more spots on average and three or fewer spots on average in the ten measurement samples.

Δ (Fair): Defects are found at four or more spots on average and five or fewer spots on average in the ten measurement samples.

× (Bad): Defects are found at six or more spots on average in the ten measurement samples.

Example 2

In Example 2, a heat-shrinkable polyester film was produced and evaluated in the same manner as in Example 1, except that PET3 was used instead of PET2 as the second polyester resin, as shown in Table 1. The obtained results are shown in Table 2.

Example 3

In Example 3, a heat-shrinkable polyester film was produced and evaluated in the same manner as in Example 1, except that the mixing proportion of the first polyester resin/second polyester resin was 50/50, as shown in Table 1. The obtained results are shown in Table 2.

Example 4

In Example 4, a heat-shrinkable polyester film was produced and evaluated in the same manner as in Example 1, except that PET3 was used instead of PET2 as the second polyester resin, and at the same time, the mixing proportion of the first polyester resin/second polyester resin was 50/50, as shown in Table 1. The obtained results are shown in Table 2.

Example 5

In Example 5, a heat-shrinkable polyester film was produced and evaluated in the same manner as in Example 1, except that the mixing proportion of the first polyester resin/second polyester resin was 30/70, and the stretch ratio in the TD direction was 2.5, as shown in Table 1. The obtained results are shown in Table 2.

Example 6

In Example 6, a heat-shrinkable polyester film was produced and evaluated in the same manner as in Example 1, except that PET3 was used instead of PET2 as the second polyester resin, the mixing proportion of the first polyester resin/second polyester resin was 30/70, and the stretch ratio in the TD direction was 2.5, as shown in Table 1. The obtained results are shown in Table 2.

Comparative Example 1

In Comparative Example 1, a heat-shrinkable polyester film was produced and evaluated in the same manner as in Example 1, except that only PET1 as the first polyester resin was used, and the mixing proportion of the first polyester resin/second polyester resin was 100/0, as shown in Table 1. The obtained results are shown in Table 2.

Comparative Example 2

In Comparative Example 2, a heat-shrinkable polyester film was produced and evaluated in the same manner as in Example 1, except that the mixing proportion of the first polyester resin/second polyester resin was 90/10, as shown in Table 1. The obtained results are shown in Table 2.

Comparative Example 3

In Comparative Example 3, a heat-shrinkable polyester film was produced and evaluated in the same manner as in Example 1, except that PET3 was used instead of PET2 as the second polyester resin, and the mixing proportion of the first polyester resin/second polyester resin was 90/10, as shown in Table 1. The obtained results are shown in Table 2.

Comparative Example 4

In Comparative Example 4, a heat-shrinkable polyester film was produced and evaluated in the same manner as in Example 1, except that only PET3 was used instead of PET2 as the second polyester resin, and the mixing proportion of the first polyester resin/second polyester resin was 0/100, as shown in Table 1. The obtained results are shown in Table 2.

Comparative Example 5

In Comparative Example 5, a heat-shrinkable polyester film was produced and evaluated in the same manner as in Example 1, except that only PET3 was used instead of PET2 as the second polyester resin, the mixing proportion of the first polyester resin/second polyester resin was 30/70, and the value of the thermal shrinkable ratio corresponding to the characteristic (E) was below 20%, as shown in Table 1. The obtained results are shown in Table 2.

TABLE 1

| | Blending | | | | Stretch ratio in |
| | First polyester resin | Second polyester resin | | | |
| | PET1 (pbw) | PET2 (pbw) | PET3 (pbw) | Additives (pbw) | TD direction |
|---|---|---|---|---|---|
| Example 1 | 70 | 30 | | 1 | 4 |
| Example 2 | 70 | | 30 | 1 | 4 |
| Example 3 | 50 | 50 | | 1 | 4 |
| Example 4 | 50 | | 50 | 1 | 4 |
| Example 5 | 30 | 70 | | 1 | 2.5 |
| Example 6 | 30 | | 70 | 1 | 2.5 |
| Comparative Example 1 | 100 | | | 1 | 4 |
| Comparative Example 2 | 90 | 10 | | 1 | 4 |
| Comparative Example 3 | 90 | | 10 | 1 | 4 |
| Comparative Example 4 | | | 100 | 1 | 4 |
| Comparative Example 5 | 30 | 70 | | 1 | 4 |

TABLE 2

| | Thermal shrinkage ratio at 80° C. in TD direction (%) | Thermal shrinkage ratio at 80° C. in MD direction (%) | Thermal shrinkage stress (MPa) | Haze value (%) | Isothermalization at 150° C. Peak area (J/g) | Peak generation time (min) | Glass transition temperature (° C.) | Blocking resistance | Fittability |
|---|---|---|---|---|---|---|---|---|---|
| Example 1 | 40 | −2 | 6.7 | 4.6 | 12.9 | 8.8 | 71 | ○ | ◎ |
| Example 2 | 37 | −1 | 7.3 | 4.1 | 16.9 | 6.7 | 70.9 | ○ | ◎ |
| Example 3 | 22 | 3 | 7.8 | 5.3 | 26 | 6.1 | 72.6 | ○ | ○ |
| Example 4 | 29 | 2 | 5.9 | 4.5 | 24.9 | 5.7 | 72.7 | ○ | ○ |
| Example 5 | 45 | 4 | 3.0 | 4.0 | 23.4 | 5.6 | 75.1 | ○ | ◎ |
| Example 6 | 49 | 5 | 3.5 | 3.7 | 21.3 | 5.6 | 74 | ○ | ◎ |
| Comparative Example 1 | 59 | −4 | 6.4 | 3.3 | — | >15 | 68.8 | X | ◎ |
| Comparative Example 2 | 48 | 6 | 5.6 | 4.1 | — | >15 | 69.7 | Δ | ◎ |
| Comparative Example 3 | 49 | 5 | 6.9 | 4.9 | <1 | 12.9 | 69.8 | Δ | ◎ |
| Comparative Example 4 | 8 | 5 | 8.2 | 4.3 | 15.3 | 5.3 | 78 | ○ | X |
| Comparative Example 5 | 17 | 8 | 8.2 | 4.5 | 14.3 | 5.7 | 75.1 | ○ | Δ |

INDUSTRIAL APPLICABILITY

According to the present invention, as the heat-shrinkable polyester film satisfies at least the characteristics (A) to (E), even when PET bottles in a state of being covered with the heat-shrinkable polyester film are recycled, the blocking phenomenon can be suppressed while excellent fittability is maintained.

That is, particularly, by controlling the exothermic peak time obtained by isothermal crystallization as the characteristic (C) and the heat quantity corresponding to the exother mic peak area obtained by isothermal crystallization as the characteristic (D) to values within predetermined ranges, recycled pellets having a predetermined shape can be produced effectively and stably.

Therefore, according to the heat-shrinkable polyester film of the present invention, not only the covering of various PET bottles and the like, regardless of being thin-walled or thick-walled, or even having a complicated shape, but also recycling together with various PET bottles and the like can be achieved.

Therefore, a process for removing the wrapped heat-shrinkable polyester film, which has been conventionally relied on manual work, can be omitted, the production cost can be reduced, it is highly advantageous economically as well as in view of shortening of the recycling time, and the industrial applicability can be said to be very high.

The invention claimed is:

1. A heat-shrinkable polyester film being produced from a first polyester resin and a second polyester resin the first and second polyester resins having different crystallinity, 90% or more by weight of the film being produced from the first and second polyester resins, a weight-based mixing proportion of the first polyester resin/second polyester resin having a value within the range of 20/80 to 80/20, wherein the heat-shrinkable polyester film satisfies the following characteristics (A) to (E):

(A) the first polyester resin is an amorphous polyester resin that is a reaction product of a first polyvalent carboxylic acid and a first polyalcohol, the first polyvalent carboxylic acid comprises terephthalic acid, when a total amount of the first polyvalent carboxylic acid is taken as 100 mol %, terephthalic acid is 90 mol % or more, the first polyalcohol comprises ethylene glycol, 1,4-cyclohexanedimethanol and/or diethylene glycol, and when a total amount of the first polyalcohol is taken as 100 mol %, ethylene glycol is 50 mol % or more and below 90 mol %, the remaining balance of the first polyalcohol is 1,4-cyclohexanedimethanol and/or diethylene glycol;

(B) the second polyester resin is a crystalline polyester resin that is a reaction product of a second polyvalent carboxylic acid and a second polyalcohol, the second polyvalent carboxylic acid comprises terephthalic acid, when a total amount of the second polyvalent carboxylic acid is taken as 100 mol %, terephthalic acid is 90 mol % or more, the second polyalcohol comprises ethylene glycol, and when a total amount of the second polyalcohol is taken as 100 mol %, ethylene glycol is 90 mol % or more;

(C) the heat-shrinkable polyester film is a heat-shrinkable polyester film in which when isothermal crystallization measurement at 150° C., including a cooling process at a constant temperature, is performed by DSC, an exothermic peak appears within 12 minutes from the start, including the cooling process time;

(D) the heat-shrinkable polyester film is a heat-shrinkable polyester film in which when isothermal crystallization measurement at 150° C., including a cooling process at a constant temperature, is performed by DSC, a heat quantity corresponding to an obtained exothermic peak area is within the range of 5 to 35 J/g; and (E) the heat-shrinkable polyester film is a heat-shrinkable polyester film in which a thermal shrinkage ratio in a main shrinkage direction as measured under thermal shrinkage conditions of being immersed in hot water at 80° C. for 10 seconds, is within the range of 20% to 60%.

2. The heat-shrinkable polyester film according to claim 1, wherein the first polyalcohol includes at least 1,4-cyclohexanedimethanol.

3. The heat-shrinkable polyester film according claim 1, wherein the second polyester resin is a homopolyester resin and a post-consumer recycled polyester resin, or either one of them.

4. The heat-shrinkable polyester film according to claim 1, wherein when a total amount of the first polyester resin and the second polyester resin is taken as 100 parts by weight, the heat-shrinkable polyester film contains a lubricating agent in an amount within the range of 0.01 to 5 parts by weight.

5. The heat-shrinkable polyester film according to claim 1, further satisfying the following characteristic (F):

(F) a thermal shrinkage ratio in a direction orthogonally intersecting the main shrinkage direction as measured under the thermal shrinkage conditions of being immersed in hot water at 80° C. for 10 seconds, is within the range of –3% to 10%.

6. The heat-shrinkable polyester film according to claim 1, further satisfying the following characteristic (G):

(G) a thermal shrinkage stress in the main shrinkage direction as measured under the thermal shrinkage conditions at 80° C. for 10 seconds, is 8 MPa or less.

7. The heat-shrinkable polyester film according to claim 1, wherein the second polyalcohol comprises ethylene glycol alone or both ethylene glycol and diethylene glycol, and in a case where the second polyalcohol comprises both ethylene glycol and diethylene glycol, when the total amount of the second polyalcohol is taken as 100 mol %, ethylene glycol is 90 mol % or more and diethylene glycol is 1 mol % to 10 mol %.

8. The heat-shrinkable polyester film according to claim 1, wherein the film comprises 0.01 to 10% by weight of at least one additive selected from an oxidation inhibitor, a weather-resistant stabilizer, an antistatic agent, an antifogging agent, a metallic soap, a wax, an antifungal agent, an antibacterial agent, a nucleating agent, a flame retardant, and a lubricating agent.

9. The heat-shrinkable polyester film according to claim 1, wherein the first polyalcohol is ethylene glycol, 1,4-cyclohexanedimethanol and diethylene glycol.

* * * * *